US010562787B2

(12) United States Patent
Hoek et al.

(10) Patent No.: US 10,562,787 B2
(45) Date of Patent: Feb. 18, 2020

(54) INTELLIGENT FLUID FILTRATION MANAGEMENT SYSTEM

(71) Applicant: Water Planet, Inc., Inglewood, CA (US)

(72) Inventors: Eric M. Hoek, Pacific Palisades, CA (US); Subir Bhattacharjee, Marina Del Rey, CA (US); Gil Hurwitz, Los Angeles, CA (US)

(73) Assignee: Water Planet, Inc., Inglewood, CA (US)

( * ) Notice: Subject to any disclaimer, the term of this patent is extended or adjusted under 35 U.S.C. 154(b) by 693 days.

(21) Appl. No.: 14/824,726

(22) Filed: Aug. 12, 2015

(65) Prior Publication Data

US 2016/0046503 A1    Feb. 18, 2016

Related U.S. Application Data

(60) Provisional application No. 62/145,793, filed on Apr. 10, 2015, provisional application No. 62/036,344, filed on Aug. 12, 2014.

(51) Int. Cl.
    *C02F 1/00*         (2006.01)
    *B01D 65/02*        (2006.01)
    (Continued)

(52) U.S. Cl.
    CPC .............. *C02F 1/008* (2013.01); *B01D 61/12* (2013.01); *B01D 61/22* (2013.01); *B01D 65/02* (2013.01);
    (Continued)

(58) Field of Classification Search
    CPC .......... C02F 2209/001; C02F 2209/003; C02F 2209/005; C02F 2209/006; C02F 2209/03;
    (Continued)

(56) References Cited

U.S. PATENT DOCUMENTS 4,482,461 A * 11/1984 Hindman ............. B01D 29/114
                                                    210/741
5,958,243 A    9/1999 Lawrence et al.
(Continued)

FOREIGN PATENT DOCUMENTS

JP    H10151328 A    6/1998
JP    3579188 B2    10/2004
(Continued)

OTHER PUBLICATIONS

U.S. Appl. No. 62/036,344, filed Aug. 12, 2014, Eric M. V. Hoek.
(Continued)

*Primary Examiner* — David C Mellon
(74) *Attorney, Agent, or Firm* — Ballard Spahr LLP

(57) ABSTRACT

A filtration system can comprise a pressure pump configured to apply a pressure on fluid flowing between a first chamber and a second chamber. The filtration system can also comprise a flow sensor configured to determine at least one parameter associated with fluid flowing across a membrane deposited between the first chamber and a second chamber. The filtration system can comprise a pressure sensor configured to determine pressure readings of the fluid flowing from the first chamber to the second chamber. The filtration system can comprise a filtration management system configured to cause the pressure pump to apply a constant pressure on fluid flowing across the membrane for a first predetermined time based on the pressure reading. The filtration management system can be configured to cause the pressure pump to reverse the fluid flow across the membrane based on the at least one parameter for a second predetermined time.

26 Claims, 17 Drawing Sheets

(51) Int. Cl.
*B01D 61/22* (2006.01)
*C02F 1/44* (2006.01)
*B01D 65/10* (2006.01)
*B01D 61/12* (2006.01)

(52) U.S. Cl.
CPC .............. *B01D 65/10* (2013.01); *C02F 1/004* (2013.01); *C02F 1/44* (2013.01); *B01D 2315/20* (2013.01); *B01D 2321/04* (2013.01); *B01D 2321/40* (2013.01); *C02F 2209/006* (2013.01); *C02F 2209/03* (2013.01); *C02F 2209/05* (2013.01); *C02F 2209/06* (2013.01); *C02F 2209/11* (2013.01); *C02F 2209/20* (2013.01); *C02F 2209/36* (2013.01); *C02F 2209/40* (2013.01); *C02F 2303/16* (2013.01)

(58) Field of Classification Search
CPC .............. C02F 2209/05; C02F 2209/11; C02F 2209/40; C02F 2209/44; C02F 2209/445; C02F 1/008; C02F 1/44; C02F 1/441; C02F 1/444; C02F 1/004; C02F 2303/16; C02F 2209/36; C02F 2209/20; C02F 2209/06; B01D 65/02; B01D 65/10; B01D 65/102; B01D 61/12; B01D 61/22; B01D 2311/14; B01D 2311/16; B01D 2311/165; B01D 2315/18; B01D 2315/20; B01D 2321/40; B01D 2321/04
See application file for complete search history.

(56) References Cited

U.S. PATENT DOCUMENTS

| | | |
|---|---|---|
| 8,100,005 B2 | 1/2012 | Fane et al. |
| 2005/0258098 A1 | 11/2005 | Vincent et al. |
| 2010/0300968 A1 | 12/2010 | Liu et al. |
| 2012/0125846 A1 | 5/2012 | Suzumura et al. |
| 2013/0060384 A1* | 3/2013 | Subbiah ................. B01D 61/12 700/266 |
| 2013/0075331 A1 | 3/2013 | Peiris et al. |
| 2013/0211602 A1 | 8/2013 | Scheu et al. |
| 2014/0048462 A1* | 2/2014 | Cohen ................. B01D 61/22 210/96.2 |
| 2015/0306544 A1 | 10/2015 | Park et al. |
| 2017/0363535 A1* | 12/2017 | Bucs ................. B01D 61/12 |

FOREIGN PATENT DOCUMENTS

| | | |
|---|---|---|
| JP | 2004-329982 A | 11/2004 |
| JP | 3601015 B2 | 12/2004 |
| KR | 20140071162 A | 6/2014 |
| WO | WO-2007/006153 A1 | 1/2007 |
| WO | WO-2010/150405 A1 | 12/2010 |
| WO | WO 2014/073947 A1 | 5/2014 |
| WO | WO-2014/088190 A1 | 6/2014 |
| WO | PCT/US2015/044845 | 8/2015 |

OTHER PUBLICATIONS

U.S. Appl. No. 62/145,793, filed Apr. 10, 2015, Eric M. V. Hoek.
Howe and Tchobanoglous, *Water Treatment: Principles and Design*, Chapter 12, John Wiley & Sons, Inc., Hoboken, New Jersey, 2nd edn, 2005. pp. 819-902.
Crittenden et al. (2012) *Water Treatment: Principles and Design*, MWH, Hoboken, NJ, USA. 30 pages.
Liu et al. (2006) *Membrane Chemical Cleaning: From Art to Science*, Pall Corporation, Port Washington, NY 11050, USA. pp. 1-25.
Chang et al. (2011) "Assessing the fouling mechanisms of high-pressure nanofiltration membrane using the modified Hermia model and the resistance-in-series model" *Separation and Purification Technology* 79: 329-336.
International Search Report and Written Opinion dated Nov. 19, 2015 for Int. Patent Application No. PCT/US2015/044845 filed on Aug. 12, 2015 (Applicants—Water Planet, Inc.; Inventors—Hoek et al.;) (13 pages).
Supplementary European Search Report and Written Opinion dated Feb. 23, 2018 by the European Patent Office for Patent Application No. 15831808.9, which was filed on Aug. 12, 2015 and published as EP 3180108 on Jun. 21, 2017 (Inventor—Hoek et al.; Applicant Water Planet, Inc.;) (9 pages).

* cited by examiner

701 — Apply a constant pressure on fluid flowing from a first chamber to a second chamber for a first predefined time, wherein a membrane is deposited between the first chamber and the second chamber for allowing the fluid to permeate the membrane from the first chamber to the second chamber 702 — Reverse the constant pressure for a second predefined time 703 — Re-apply the constant pressure for the first predefined time

Apply a constant pressure on fluid flowing from a first chamber to a second chamber, wherein a membrane is deposited between the first chamber and the second chamber

902

Determine a threshold has been exceeded on a filtration system

903

Initiate a backflow process on the filtration system in response to determining that the threshold has been exceeded

INTELLIGENT FLUID FILTRATION MANAGEMENT SYSTEM

CROSS REFERENCE TO RELATED APPLICATIONS

This application claims priority to U.S. Provisional Application Ser. No. 62/036,344, filed Aug. 12, 2014, entitled, "Intelligent Flux Management System for Crossflow Membrane Systems" and U.S. Provisional Application Ser. No. 62/145,793, filed Apr. 10, 2015, entitled, "Intelligent Fluid Filtration Management System," the contents of each application are hereby incorporated by reference.

BACKGROUND

In practice, filtration can be broadly classified into six separation categories: solids-gases, solids-liquids, solids-solids, liquids-liquids, gas-liquids, and gas-gas. Filtration technologies are used to separate contaminants and value-added materials in a wide range of process applications, such as automotive and aerospace fuel and air filtration, household and industrial air filtration, food and beverage concentration and sterilization, pharmaceutical molecule isolation and purification, medical therapeutics like kidney dialysis and blood oxygenation, potable water treatment, industrial process water purification, as well as waste treatment and environmental remediation. For example, filtration is the most important and widely used method for water purification due to its ability to completely and continuously filter impurities by size exclusion, preferential adsorption, and diffusion on a large scale (Howe and G. Tchobanoglous, *Water Treatment: Principles and Design*, John Wiley & Sons, Inc., Hoboken, N.J., $2^{nd}$ edn, 2005). Nearly all municipal and industrial water and wastewater treatment facilities, most groundwater treatment facilities, and large and small desalination facilities employ some form of filtration for the removal of problematic material, such as microorganisms, clay, sediment, oil, and other organic and inorganic solutes (Crittenden, J., et al. (2012) *Water Treatment: Principles and Design*, MWH, Hoboken, N.J., USA).

Generally, fluid filtration constitutes the separation and removal of target suspended and dissolved solids from water by the relative rates of passage through a separation medium. Fluid filtration systems most commonly embody the following treatment technologies: granular media filtration (e.g., sand, anthracite, garnet, nutshells, non-woven fabrics, and other non-reactive waste biomass), ion exchange media filtration, adsorptive media filtration (e.g., granular activated carbon or GAC, zeolites, polymer and organoclays), reactive media filtration (e.g., greens and oxidative filtration, bio-sand filtration, bio-GAC filtration), low pressure membrane filtration (e.g., microfiltration and ultrafiltration), and high-pressure membrane filtration (e.g., nanofiltration and reverse osmosis).

Most filtration processes are limited by the accumulation of removed material on or in the filter medium. For example, when a membrane is used to filter impurities from a water sample, the flux will gradually decrease with time as the membrane becomes clogged or "fouled" by inorganic particulates, organic matter, and/or biological microorganisms. Membrane fouling often results in severe flux or throughput decline, affecting the process efficiency and quality of the water produced. Indeed, filter clogging and its mitigation remains the major operational challenge of filtration technologies due to dramatic effects on filtrate quality, maintaining target filtration throughput, energy efficiency and filter damage.

Filter clogging is an inevitable phenomenon that occurs during filtration, but can be mitigated by routine maintenance strategies before complete replacement is needed. Specifically, flux maintenance techniques can be defined as system processes implemented to recover filtrate flux by removing reversible foulants and deposits on or within the filter and/or inhibiting their future deposition. Common maintenance strategies include variable forms of mechanical and chemical cleaning, such as filtrate backwashing and in-situ chemical cleaning (e.g., caustics, oxidants/disinfectants, acids, chelating agents, and surfactants) (Liu, C., et al. (2006) *Membrane Chemical Cleaning: From Art to Science*, Pall Corporation, Port Washington, N.Y. 11050, USA). However, each maintenance response can negatively affect the efficiency of the process by increasing system downtime, consuming the commoditized filtrate product, consuming costly cleaning chemicals, and damaging the filter through harsh cleaning methods. Currently, these filter maintenance techniques are implemented using pre-determined design criteria-frequency, intensity and duration—and cannot adapt in real-time to spatial and temporal variations within a given filtration process. Therefore, there is a need for adaptive process control techniques for operating filtration-based processes in order to optimize the maintenance response and minimize the effect of filter contamination on operating energy requirements and life cycle performance.

Considerable effort is associated with responding to the removal and replacement of expired filters and can result in significant system downtime and cost. The useful lifetime of a filter module, filter media, ion exchange resin, or granular activated carbon is site-specific based upon unique environmental conditions and water quality for a given treatment objective. Therefore, maximizing plant efficiency requires the need to predict the useful life of a module(s) based on information directly associated with a specific performance of the said module(s) in a given application. These and other shortcomings are addressed in the present disclosure.

SUMMARY

It is to be understood that both the following general description and the following detailed description are exemplary and explanatory only and are not restrictive, as claimed. Provided are methods and systems for intelligent fluid filtration management. The methods and systems can monitor one or more parameters associated with one or more membranes of a filtration system. A condition of the one or more filters can be determined based on the monitored one or more parameters of the filtration system. The condition can comprise one or more of an upcoming filter ripening or state of filtration readiness, a detected filter ripening or state of filtration readiness, an upcoming integrity breach, a detected integrity breach, an upcoming permeability loss, a detected permeability loss, combinations thereof and the like. One or more maintenance procedures can be performed based on the determined condition. The one or more maintenance procedures can comprise one or more of a filter cleaning procedure, a filter isolation procedure, a filter repair procedure, a filter replacement procedure, and a filter pinning procedure.

In an aspect, a filtration management system can monitor at least one of a change in fluid filtrate throughput during constant pressure operation and a change in pressure during constant filtrate throughput operation. A fouling mechanism can be determined based on at least one of the change in filtrate throughput and the change in pressure. The fouling mechanism can be determined by performing a mathematical analysis of the change in filtrate flow or change in pressure according to one or more predetermined fouling models. The one or more predetermined fouling models can comprise one or more of a Hermia's model, a modified Hermia's model, and a resistance-in-series model A cleaning protocol can be selected based on the determined fouling mechanism. The cleaning protocol can comprise selecting a cleaning method and one or more parameters associated with the cleaning method In an aspect, a filtration system can comprise a pressure pump configured to apply a pressure on fluid flowing between a first chamber and a second chamber. The filtration system can also comprise a flow sensor configured to determine at least one parameter associated with fluid flowing across a membrane deposited between the first chamber and a second chamber. The filtration system can comprise a pressure sensor configured to determine a pressure reading of the fluid flowing from the first chamber to the second chamber. Furthermore, the filtration system can comprise a filtration management system configured to cause the pressure pump to apply a constant pressure on fluid flowing across the membrane from the first chamber to the second chamber for a first predetermined time based on the pressure reading. The filtration management system can be further configured to cause the pressure pump to reverse the fluid flow across the membrane based on the at least one parameter for a second predetermined time.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE FIGURES

The accompanying drawings, which are incorporated in and constitute a part of this specification, illustrate embodiments and together with the description, serve to explain the principles of the methods and systems:

FIG. 7 shows a flowchart illustrating an example method for operating a filtration management system in control mode;

FIG. 9 shows a flowchart illustrating an example method for operating a filtration management system in response to a step change in flux;

Figure 1:
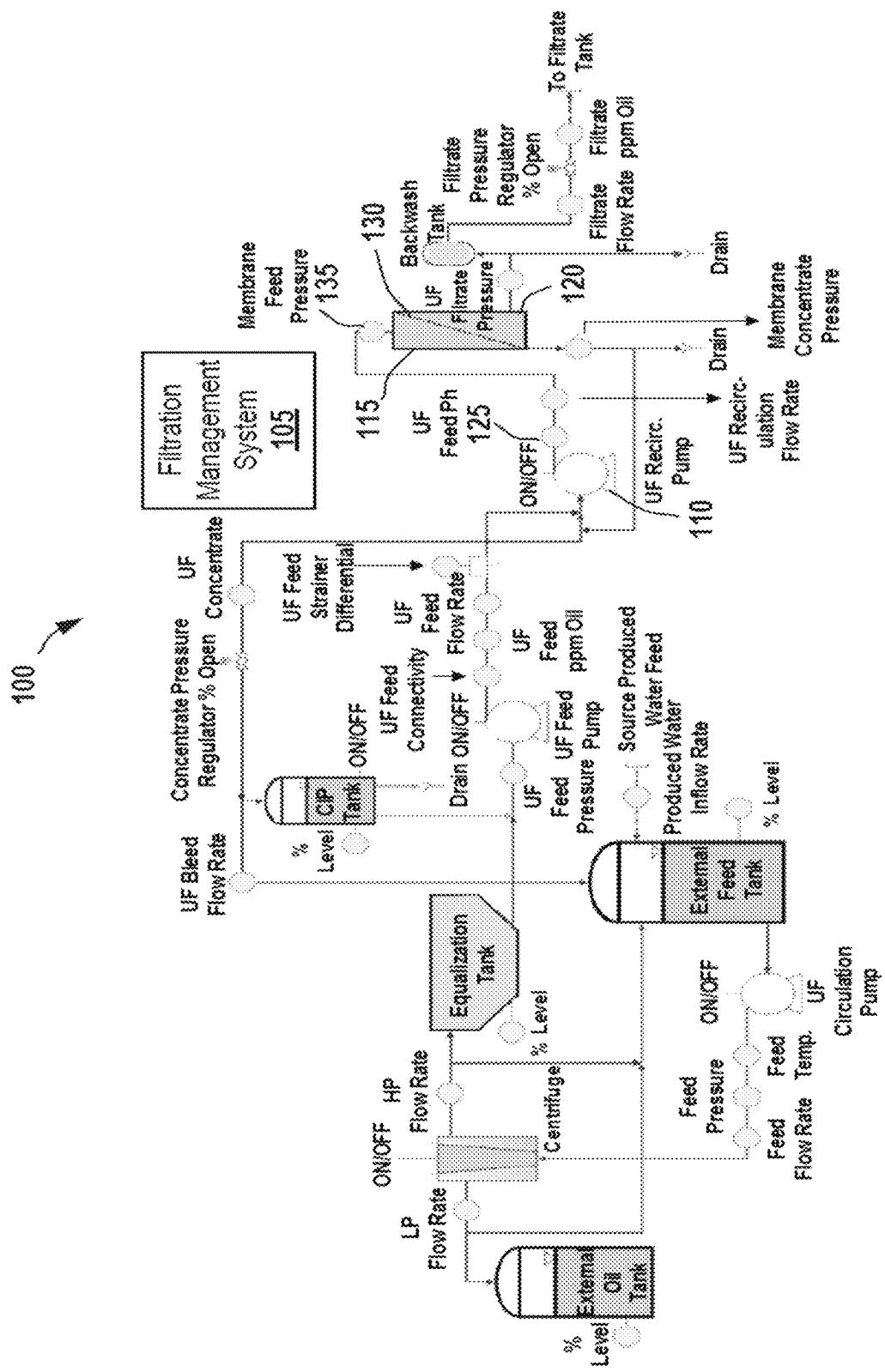
FIG. 1 shows a representative schematic depiction of the constant throughput variable feed pressure operation of a membrane process.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the methods and systems, as claimed.

DETAILED DESCRIPTION

The present disclosure can be understood more readily by reference to the following detailed description of the methods and systems and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided herein can be different from the actual publication dates, which can require independent confirmation.

As used in the specification and the appended claims, the singular forms "a," "an" and "the" include plural referents unless the context clearly dictates otherwise. Thus, for example, reference to "a membrane," "a valve," or "a sensor" includes mixtures of two or more such membranes, valves, or sensors, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

As used herein, "fluid" refers to any substance that continuously deforms or flows under an applied shear stress. Fluids include, but are not limited to, liquids, gases, and plasmas.

As used herein, "filter" refers to any semi-permeable barrier or porous device for removing impurities from a fluid. A fluid filter may include, but is not limited to, a membrane or a sieve, a packed media bed, a fluidized media bed, a membrane bioreactor, and an ion exchange system. Filtration separation mechanisms include, but are not limited to, size exclusion, adsorption, preferential solution/diffusion, electromagnetic attraction/repulsion, electrostatic attraction/repulsion, chemical reaction, or a combination thereof.

As used herein "fouling" refers to a deposition of organic and inorganic matter on a filter surface or within filter pores and a void space. Fouling includes, but is not limited to, a deposition or an adsorption of inorganic particles (e.g., clays, minerals, metals, etc.), immiscible hydrocarbons (e.g., oil and grease), dissolved and precipitated organic molecules, and bacteria or algae on the fluid filtration system filter described herein.

As used herein, "feed stream" refers to any aqueous or non-aqueous fluid comprising filterable solutes and/or particulate matter.

As used herein, "permeate stream" refers to any fraction of the feed stream that has been directed through a filter by means of a pressure-driven or gravimetric filtration apparatus.

As used herein, "flux" refers to fluid flow across a unit area of a filter. Flux can be, but is not limited to, permeate flux or draw flux.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

A. Semi-Permeable Membranes

In an aspect, the methods and systems of the disclosure relate to pressure-driven filtration processes that use a membrane as a separation barrier to remove solutes and suspended particles from a solution or a liquid suspension. In an aspect, the membrane can be a semi-permeable membrane.

Semi-permeable membranes can be used to separate dissolved or dispersed materials from feed streams. The separation process can involve bringing a feed solution into contact with one surface of the semi-permeable membrane under pressure so as to affect permeation of a solvent phase through the semi-permeable membrane while permeation of the dissolved or dispersed materials is prevented.

Semi permeable membranes can be made of polymers, ceramics, or metals. These polymeric, ceramic, or metallic membranes can be packed into elements and modules that have many possible combinations (form factors), such as a flat sheet module, a plate and frame module, a spiral wound module, a tubular module, a hollow fiber module, combinations thereof, and the like. Furthermore, these semi-permeable membranes can all be synthesized to display a broad range of selectivity and permeability, essentially ranging from microfiltration (MF) and ultrafiltration (UF) to nanofiltration (NF) and reverse osmosis (RO).

Both RO and NF membranes can comprise a thin film discriminating layer fixed to a porous support, collectively referred to as a "composite membrane." MF and UF membranes can also comprise a composite arrangement. The porous support can provide physical strength but the porous support can offer little resistance to flow due to its porosity. On the other hand, the thin film discriminating layer can be less porous and can provide the primary means of separation of dissolved or dispersed materials. Therefore, the thin film discriminating layer can be mostly responsible for a given membrane's "rejection rate"—the percentage of a particular dissolved or dispersed material (e.g., solute) rejected, and "flux"—the flow rate per unit area at which the solvent passes through the membrane.

Semi-permeable membranes vary with respect to their degree of permeability to different ions as well as organic and inorganic compounds. For example, "diffusive membranes" (e.g., NF and RO) are relatively impermeable to virtually all ions, including sodium and chloride, as well as uncharged solutes with molecular weights above about 200 Daltons. Therefore, RO membranes are widely used for the desalination of brackish water or seawater to provide highly purified water for industrial, commercial, or domestic use because the rejection rate of sodium and chlorine ions for RO membranes is usually greater than about 90 percent. Conversely, "low pressure membranes" (e.g., MF and UF) can be relatively porous and, therefore, used for removal of colloidal and particulate matter (e.g., from about 0.1 μm to about 10 μm for MF and 0.01 μm to 0.1 μm for UF). MF and UF can be used in both municipal and industrial treatment applications for particle and pathogen removal, NF/RO pretreatment, chemical synthesis purification, and the like.

MF and UF membranes can be composed of either inorganic or polymeric materials in a range of geometries. Membranes can be configured in various module configurations, such as, for example, a tubular configuration, a plate-and-frame configuration, a spiral wound configuration, a hollow fiber configuration, combinations thereof, and the like. Polymeric MF and UF membranes can be constructed from various polymers, such as, for example, cellulose acetate, polyvinylidene fluoride, polyacrylonitrile, polypropylene, polysulfone, and polyethersulfone. Polymeric membranes can be manufactured relatively economically with various form factors, but can be limited to a narrow operating range with respect to modest pH, temperature, and chemical tolerances. Ceramic membranes, made from materials such as alumina, zirconia, and titania, can be used in applications where conditions dictate operation at high temperature or harsh cleaning chemicals may be required.

MF and UF membranes can be constructed with a symmetric pore structure to allow in-situ fouling control by backwashing or backflushing. As used herein, "backwash" or "backflush" refers to reversing the direction of flow of a permeate stream by applying a pressure difference greater than a forward filtration transmembrane pressure, which can be mechanically and/or osmotically-driven. Backwashing includes, but is not limited to, the use of a permeate liquid, purified water, or a chemically-enhanced permeate liquid by the addition of supplemental chemicals, such as acids, caustics, and/or oxidants.

In a further aspect, the intelligent fluid filtration management process may be employed with the use of a MF membrane, an UF membrane, a NF membrane, a RO membrane, a forward osmosis membrane, and a pressure retarded osmosis membrane without thin film coating. In addition, the intelligent fluid filtration management process may be employed with the use of a ceramic and a polymeric membrane. In a still further aspect, the semi-permeable membrane is employed in a tubular configuration, a plate and frame configuration, a spiral wound configuration, a hollow fiber configuration, or a membrane bioreactor configuration.

In a still further aspect, the intelligent fluid filtration management process may be employed with the use of a non-membrane-based filtration, an ion exchange, and activated carbon systems such as sand filtration mixed media filtration, ion exchange, granular activated carbon, and critical cartridge and spiral wound filtration systems, due to the mechanisms of filtration and filter maintenance mirroring those of the membrane-based aspect described herein.

B. Fluid Filtration Management Systems

FIG. 1 illustrates an example filtration system 100 that a filtration management system 105 manages. In an aspect, the disclosure relates to a filtration system 100 comprising a pressure pump 110 configured for applying pressure on fluid flowing between a first chamber 115 and a second chamber 120. The filtration system 100 can further comprise a flow sensor 125, configured to determine at least one parameter associated with fluid flowing across a membrane 130 deposited between the first chamber 115 and the second chamber 120. The filtration system 100 can further comprise a pressure sensor 135 coupled to the pressure pump 110 and the flow sensor 125 and configured to determine a pressure reading of the fluid flowing from the first chamber 115 to the second chamber 120. Furthermore, the filtration system 100 can comprise the filtration management system 105 in communication with the pressure pump 110, the flow sensor 125, and the pressure sensor 135. The filtration management system 105 can be configured to cause the pressure pump to apply a constant pressure on fluid flowing from the first chamber 115 to the second chamber 120 for a first predetermined time based on the pressure reading from the pressure sensor 135. The filtration management system 105 can cause the pressure pump 110 to reverse the fluid flow across the membrane 130 at the constant pressure for a second predetermined time based on the at least one parameter.

Pressure driven membrane filtration processes, such as microfiltration (MF), ultrafiltration (UF), nanofiltration (NF), and reverse osmosis (RO), use a semi-permeable membrane as a separation barrier to remove solutes and suspended particles from a solution or a liquid suspension. Application of a transmembrane pressure (TMP) difference causes the flow of the solvent across the membrane, while retaining the solutes or particles in the feed.

A clean solvent flow rate (or flux) across a membrane can be governed by the Darcy equation, which states that the flux (volumetric flow rate per unit cross-sectional area of the membrane) is linearly proportional to the applied pressure difference:

$$J_0 = L_p \Delta P = \frac{\Delta P}{\mu R_m}.$$

During a filtration process, the solutes and particles that are retained by the membrane can accumulate at the membrane surface. The mechanism of solute concentration buildup at the membrane surface can be referred to as concentration polarization. The increase in solute concentration at the membrane surface can lead to additional resistances toward the solvent flow across the membrane. These resistances can decrease the filtrate or permeate flux. A few pertinent mechanisms of resistance increase and ensuing flux decline are summarized in Table 1.

TABLE 1

| Mechanism | Description |
|---|---|
| Concentration polarization | Higher concentration of the retained solute on the feed side of the membrane lowers the solvent activity compared to the permeate side. This manifests as a pressure difference (the osmotic pressure difference) that tends to drive the solvent from the permeate to the feed side. This osmotic pressure difference reduces the effective transmembrane pressure difference for solvent flow across the membrane. This mechanism is dominant for small solutes, such as salt ions, and is generally the dominant mechanism of flux decline during reverse osmosis. |
| Gel layer formation | If the retained solute concentration at the membrane surface on the feed side attains a critical value called the gel concentration, a concentrated gel-like deposit starts forming on the membrane. The gel layer imposes an additional resistance toward the permeation of the solvent across it. This mechanism is common during UF or NF of proteins, whey, juice and beverages, and is common in food, beverage and pharmaceutical filtration operations. |
| Cake formation | Suspended particles or aggregates formed by coagulation of small solutes can be brought to the membrane surface due to the hydrodynamic drag of the permeating solvent. As these particles deposit on the membrane, they start to form a cake layer, which causes additional resistance to the permeation of solvent. The cake layer resistance is similar to the gel layer resistance, with the only difference being that the gel layer is more compact, substantially thin, and has a very high specific resistance compared to the cake layer. Often the cake layer thickness is limited during a tangential flow filtration as the flow scours the surface of the cake beyond a critical height, preventing its further growth. |
| Adsorption | Solutes can adsorb onto the surface of the membrane, thereby partially or completely blocking the membrane pores. Adsorption can lead to various mechanisms of permeability loss of membranes, most of which are of a permanent (irreversible) nature. Adsorption can result in incomplete pore blocking, or reduction in pore radius. |

TABLE 1-continued

| Mechanism | Description |
|---|---|
| Cake-enhanced concentration polarization | This mechanism is manifested during filtration of colloidal particles by nanofiltration or reverse osmosis membranes, i.e., salt rejecting membranes. In this case, the charged particle is first deposited on the membrane, forming a cake layer. As the cake layer is formed, the charged particles modify the transport of the ions across the cake layer owing to electrokinetic effects, as well as hindered diffusion in the constricted porous medium. These mechanisms cause an enhanced osmotic pressure drop across the cake layer, thereby reducing the overall permeate flux. |

The diversity of flux decline mechanisms can lead to different types of spatio-temporal variation of permeate flux for different types of membrane elements, modules and membrane filtration systems. Each mechanism described in Table 1 can result in a different type of time dependence of the flux decline behavior. Over time, more solutes can accumulate onto the membrane. The accumulation of solutes can increase the overall resistance to solvent flow across the membrane, and cause a decrease in filtrate flux with time. In many types of commercial scale tangential flow membrane elements and modules, such as a tubular module, a plate and frame module, a spiral wound module, a hollow fiber module, or a membrane bioreactor module, the extent of solute deposition onto the membrane can vary spatially as well. Consequently, along with a time dependent variation of flux, there can also be a localized spatial variation in flux along each type of membrane module or element. For example, a flux loss profile for NF and RO membranes can illustrate organic fouling of a lead element. The organic fouling of the lead element can be characterized by gradual flux loss by cake formation. Furthermore, the flux loss profile for NF and RO membranes can illustrate inorganic scaling on the tail element, which can be characterized by dramatic and sudden flux loss by inorganic precipitation and complete pore blocking.

Different flux decline mechanisms, various types of module and element geometries, and complex feed chemistries and compositions in commercial applications of membrane processes can make it challenging to develop a general mechanistic model of flux decline and membrane fouling that can be implemented as an operational and process control algorithm. Process control of membrane filtration systems can involve maintaining a constant volumetric throughput from the membrane filtration system. In other words, an average permeate flux from a membrane module can be monitored during a process. If there is any decline in throughput, the control algorithm can increase the driving force (such as applied TMP) to keep the flux at a desired set point. This operational philosophy completely disregards any of the flux decline mechanisms, and is employed for all types of pressure driven membrane separation processes ranging from microfiltration to reverse osmosis, and membrane type (ceramic or polymeric).

Figure 2:
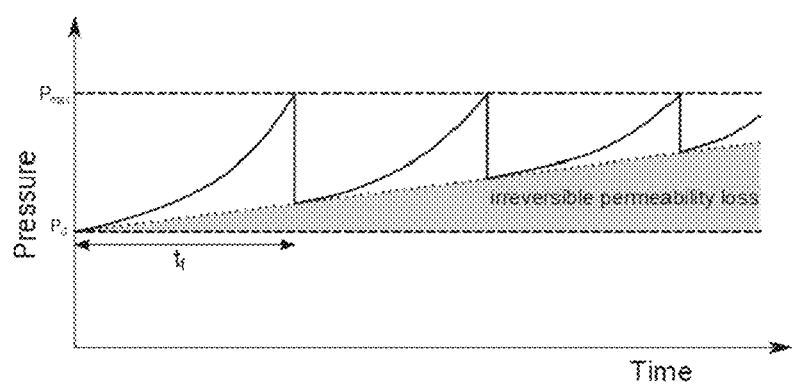
FIG. 2 shows a representative schematic depiction of the constant pressure variable flux operation of a membrane process.

FIG. 2 schematically shows the variation of an applied pressure on a feed side of a membrane element with respect to time. The applied pressure is increased to maintain a constant permeate flux through the membrane element. The applied pressure increases continuously as different fouling mechanisms during filtration reduce overall membrane permeability. When the applied pressure reaches a maximum threshold $P_{max}$, during a filtration cycle, $t_f$ the filtration is stopped and a membrane cleaning mechanism is initiated. In some applications, the filtration cycle is on a fixed timer, with $t_f$ being constant between consecutive cycles. In such cases, a maximum applied pressure $P_{max}$ can change between the filtration cycles. The cleaning mechanism can differ depending on a type of the membrane element, as well as a membrane process, and can range from backwashing (BW), chemically enhanced backwash (CEB), permeate relaxation (PR), pressure pulsing (PP), air scouring (AS), chemical pulse (CP), feed flow reversal (FFR), clean in place (CIP), combinations thereof, and the like. Following performance of the cleaning mechanism, permeability of the membrane element is partially recovered. The recovered part of the permeability is attributed to reversible fouling of the membrane element during the filtration cycle, and the unrecovered part of the permeability is due to irreversible fouling. In a constant throughput mode of operation, a part of the irreversible permeability loss of the membrane element can also be caused by compaction of the membrane element due to the high pressure during operation. Furthermore, energy demand of the filtration process is time dependent, as the pressure increase requires the power draw to the filtration system to be increased.

In a constant pressure variable throughput operation mode, a TMP can be initially set and permeate flux decreases with time during a filtration cycle owing to various flux decline mechanisms. Two modes of operation can be possible: (i) fixed filtration time mode, where the forward filtration time, $t_f$, is constant, and (ii) fixed flux drop mode where the flux is allowed to reach a minimum value, $J_f$, before the cleaning mechanism is triggered. After cleaning, the flux recovery is often incomplete due to irreversible membrane fouling.

Figure 3:
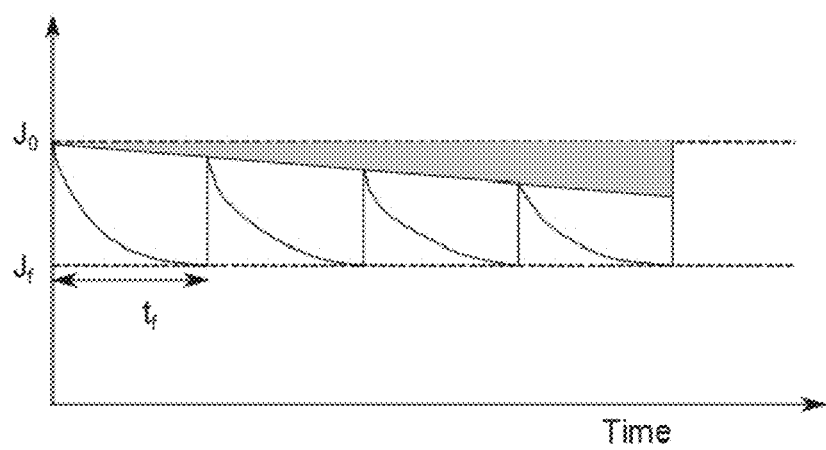
FIG. 3 shows a representative diagram of a filtration management system.

FIG. 3 illustrates a representative diagram depicting a constant pressure variable flux operation of a membrane process is shown. The vertical axis depicts the flux. The shaded region represents the irreversible permeability loss. A mode of operating filtration systems can be a constant throughput (CT) variable transmembrane pressure (TMP) mode, in which pressure is gradually increased to maintain a constant permeate throughput across a membrane. Implementation of this process control can require a flow rate measurement device to record a throughput and a pressure control mechanism for adjusting a feed pressure. This type of process control can have problems of a proportional integral derivative (PID) control loop; namely, that the process control can be reactive (feedback control mechanism), can be based on constant parameters, is not based on actual mechanisms of membrane flux decline, and does not provide optimal or adaptive control.

From a membrane process perspective, a problem of the above PID control loop is with the determination of a flux set point. If the flux set point is an initial flux, $J_0$, pressure can increase too sharply during initial stages of filtration as a flux decline can be quite rapid during these stages. Such an increase in pressure can compact a membrane quite dramatically.

The second issue with the PID control loop in the CT mode of operation is related to a sudden surge of foulant concentration in the feed. When such a surge hits the membrane, the flux drops suddenly. In response to such a sudden flux decline, the PID control loop can try to increase the pressure to keep the flux constant. In membrane processes operating in a mass transfer controlled regime, the flux may not respond linearly with applied pressure. Thus, the pressure can be increased significantly to achieve a relatively small enhancement of flux. Furthermore, such flux enhancement may come at the cost of lowered permeability through the membrane as a higher permeation drag forces more solutes to a membrane surface or to embed into membrane pores, fouling the membrane more aggressively. In some instances, the increased feed pressure can enhance the mass transfer in the membrane by increasing the axial pressure drop, which causes the crossflow to increase. Thus, increasing pressure in response to a sudden rise in feed solute concentration is not a prudent approach of flux control in membrane processes.

The flux decline in a membrane element can be a manifestation of fouling occurring during a filtration process. Flux decline can be considered as the direct and unequivocal indicator of membrane fouling and performance loss. If flux decline can be tracked during a large scale commercial filtration operation, then this information can be adapted to develop a control and operational architecture for membrane processes that can intelligently: a) assess the dominant mechanisms of fouling during a filtration process; b) learn to trigger cleaning mechanisms automatically once a critical level of fouling and flux decline is observed; c) adapt to the most economical operational regime for a given feedwater quality and process configuration; d) respond dynamically to sudden fluctuations in feedwater quality, even shutting down the process during an unwanted and catastrophic surge in feedwater foulant levels; e) lower energy consumption; f) cycle automatically between various modes of system maintenance, like backwash and clean in place; g) prolong the useful life of membranes and optimize the cost of water treatment; combinations thereof; and the like.

The permeate flux is engendered by the applied pressure (driving force) during membrane filtration. In other words, the applied pressure is the cause and the flux is the effect. In a constant pressure (CP) operating mode, the driving force remains constant, and the ensuing flux variations are simply manifestations of how different fouling resistances build up over time, leading to such flux decline under the influence of the fixed driving force. In a constant throughput (CT) mode of operation, however, the driving force itself is changed in response to variations in flux. The change in driving force can change the process dynamics to regimes where additional mechanisms can be invoked under a different operating pressure. A common example of this alteration of fouling mechanism is the transition between osmotic pressure control and gel layer control above a critical TMP difference during some types of protein and polymer filtration. Below the threshold pressure, the polymer solution does not gel, and the dominant mechanism of concentration polarization is osmotic pressure buildup. However, if the critical pressure for gel concentration is attained, the dominant mechanism of flux decline becomes the growth of a gel layer.

The constant pressure (CP) mode of operation can be used in a process control architecture that relies on the flux decline as a key signal. The constant pressure mode can prevent alteration in the causalities between pressure and flux.

Herein, an aspect of the proposed intelligent filtration management system that triggers a backwash in a filtration system comprising a membrane under a constant pressure mode of operation is disclosed. Disclosures herein demonstrate how following the flux decline pattern may allow for collection of pertinent information about the behavior of a filtration system under a given driving force (TMP) and feed conditions, how that information can be utilized to tune the performance of the filtration system, triggering backwash or CIP in response to sudden variations in the throughput, and to differentiate the CP mode of operation from a CT mode of operation. However, other filtration systems are contemplated.

Assuming that a membrane filtration system starts operation at an initial flux of $J_0$, which corresponds to an initial TMP of $\Delta P_0$. During the forward filtration cycle, the flux changes with time, and this variation is recorded at fixed time intervals of $\Delta t$. After a forward filtration time of $t_f$, the backwash cycle is initiated. During backwash, a portion of the permeate collected during the filtration cycle is forced back through the membrane from the permeate to the feed side. The back wash flux, $J_{BW}$, can be larger than the forward filtration flux, but the duration of backwash, $t_{BW}$, can be much smaller than the forward filtration time. This condition mobilizes the deposited solids from the surface of the membrane and entrains them into the recirculating feed. This type of backwash can be employed during ceramic membrane based filtration operations.

Figure 4:
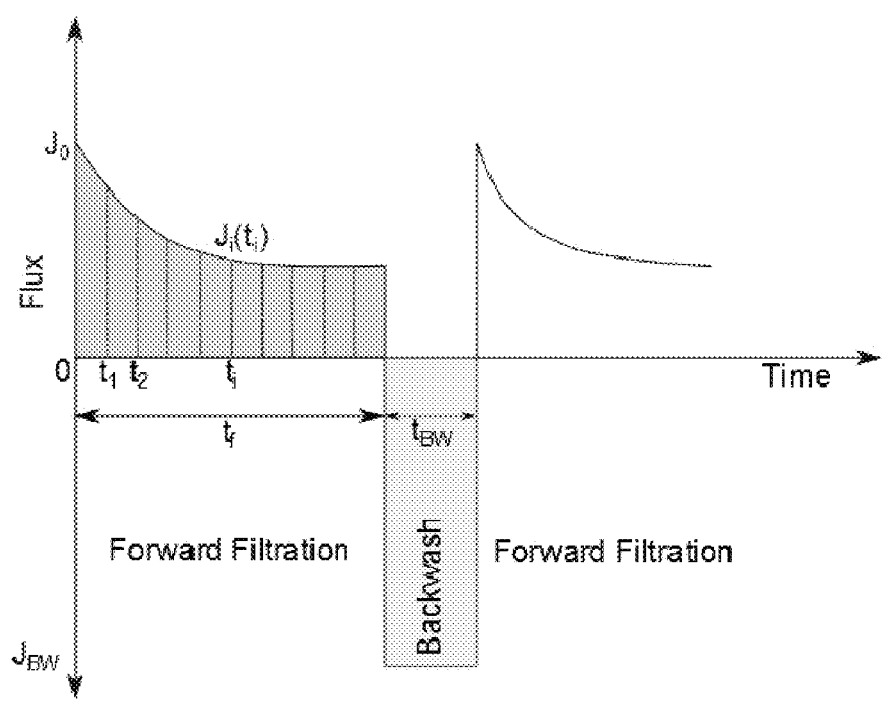
FIG. 4 shows representative flux profiles during forward filtration followed by backwash.

FIG. 4 schematically depicts the flux vs. time profile during two consecutive filtration cycles with an intermediate backwash. The flux decreases with time, and the cumulative production of permeate (or filtrate) during the filtration cycle is $$Q_f = A_m \int_0^{t_f} J(t)\,dt = A_m \frac{t_f}{2N}[J_0 + 2J_1 + 2J_2 + \ldots + 2J_i + \ldots + J_N] \quad (1)$$

where $A_m$ is the membrane area, and the final expression is based on the discretized measurements of the flux at fixed time intervals (there being N intervals) integrated using the trapezoidal rule.

The total volume of permeate consumed during backwash is $$Q_{BW} = A_m J_{BW} t_{BW} \quad (2)$$

The backwash ratio is then defined as $$r_{BW} = \frac{Q_{BW}}{Q_f} \quad (3)$$

For a filtration operation with backwash, it is desirable to have as small a backwash ratio as possible, with typical targets of $r_{BW} < 0.2$. The net product water throughput from the membrane plant is $$\dot{Q}_{net} = \frac{Q_f - Q_{BW}}{(t_f + t_{BW})} \quad (4)$$

The rate of flux decline during the filtration cycle is given by $$\frac{dJ}{dt} = \frac{J(t + \Delta t) - J(t)}{\Delta t} \quad (5)$$

If a flow measurement device records the flux at regular intervals, then the rate of flux decline can be represented at each time instant, $t_i$ (instantaneous decline), as $$\frac{dJ}{dt_i} = \frac{J(t_i + \Delta t) - J(t_i)}{\Delta t} \quad (6)$$

Equations (1) and (6) represent the integral and derivatives of the same sequence of time dependent permeate flux, respectively.

One may be tempted to construct a proportional integral derivative (PID) type control algorithm using these flux measurements without further scrutiny. Such an approach can require the definition of a set point, which could be a desired flux, and based on the deviation of a given flux measurement from the set point, will adjust a control variable (generally the applied pressure), which will minimize the deviation of the flux from the set point. This is the approach previously referred to as constant throughput (CT) variable pressure model.

As discussed herein above, the PID control mechanism suffers from two main issues. Firstly, the determination of the flux set point. If the set point is the initial flux, $J_0$, the pressure will increase too sharply during the initial stages of filtration as the flux decline is quite rapid during these stages. Such an increase in pressure can compact a membrane quite dramatically. The second concern is related to a sudden surge of foulant concentration in the feed, causing the flux to drop suddenly. In PID filtration management systems the pressure needs to be increased significantly to achieve a relatively small enhancement of flux. This in turn may result in lowered permeability due to increased fouling caused by the higher permeation drag forcing more solute to the membrane surface.

1. Constant Pressure Variable Throughput Operation Mode

The constant pressure variable throughput mode of operation is somewhat different in scope than the constant throughput variable pressure mode of operation if the power consumption of the process during these two types of operation is considered. The power consumption of a given process can be related to the water horsepower, given by $$P = \dot{Q}_m \Delta P = J A_m \Delta P$$

For a constant pressure operation, J=J(t), whereas for a constant throughput operation, the TMP difference is a function of time. The key difference in the power output of the filtration system operated in the two modes is that for the constant pressure operation, the power consumption does not increase (it either remains constant or decreases) as the flux decreases during the filtration cycle; whereas for a constant throughput operation, the power consumption increases during the filtration cycle. The increase in power consumption during the CT operation is related to generation of the additional driving force to push the permeate at a constant rate through a less permeable filtration barrier.

In most commercial membrane elements and modules, the extent of concentration polarization, fouling, and particle deposition varies axially, along the length of the module. Such variations give rise to different extents of flux decline at different locations of the module or element. The throughput from the module represents a spatially averaged permeate flux along the module multiplied by the membrane area. The local permeate flux in the module varies depending on the fouling mechanism. In most applications, the fouling is more severe in downstream locations of the module, resulting in a lower flux from these locations. In many of these modules, tangential flow is employed to limit the extent of fouling. In some applications, feed flow reversal (FFR) can be utilized to prevent excessive asymmetric fouling of one end of the module.

Irrespective of the mechanism of membrane fouling in commercial modules, most modules and elements are fouled asymmetrically, and often an element requires replacement when only a part of it becomes irreversibly fouled to a large extent. The asymmetric fouling of membrane elements is a result of the mass transfer characteristics of tangential flow filtration systems. It is of interest to explore how operating a commercial scale membrane element employing the constant pressure variable throughput and the constant throughput variable pressure modes can lead to different extents of asymmetric fouling of the element.

Fouling initiates at the downstream end of the membrane, causing a loss of permeability in these regions of the membrane. The filtrate recovery decreases from these regions. In a constant pressure operation, the lower permeation increases the volumetric tangential flow during a steady state process. As the crossflow velocity increases, so does the axial friction loss. While increased crossflow is beneficial for mass transfer, and leads to the removal of fouling layers in some types of membrane processes, higher cross-flow is generally associated with higher axial pressure drop in the module. This process is aggravated during the constant throughput mode of operation, as increasing the overall driving pressure while parts of the membrane lose permeability increases the axial flow component more aggressively. Thus, although the production of filtrate or permeate from the module remains constant in this type of operation, the production is largely due to increased permeation from the unfouled regions of the membrane at the leading edge of the elements. The higher permeation from these locations enhance the permeation drag, and hence, accumulation of foulants onto these parts of the membrane. Finally, as the membrane is choked but a higher driving pressure is imposed on the feed, the axial flow increases, increasing the frictional pressure drop along the module. The overall result of this is a higher operating cost of the membrane process when operated in the constant throughput variable pressure mode.

In a further aspect, causing the pressure pump to reverse the constant pressure based on the at least one parameter comprises comparing the determined at least one parameter to at least one threshold value. In a still further aspect, the at least one parameter is one or more of a fluid flow velocity, a change rate of fluid flow velocity, a fluid volume permeate through the membrane for a predefined time period.

In a further aspect, the filtration system can further comprise a timer, configured for at least one of adjusting time for applying the constant pressure and adjusting time for reversing the constant pressure.

In a further aspect, one or more of the first predetermined time and the second predetermined time is a constant value. In a still further aspect, one or more of the first predetermined time and the second predetermined time is determined based on a predefined formula.

In a further aspect, the reversed pressure is a constant pressure.

2. Pressure Pump

In various aspects, the filtration system comprises a pressure pump configured to apply pressure on fluid flowing between the first chamber and the second chamber. The pressure pump supplies the pressure needed to push the fluid through the membrane, even as the membrane rejects the passage of impurities through it. Microfiltration and ultrafiltration can operate within the range of from about 3 psi to about 50 psi, which is considerably lower than nanofiltration and reverse osmosis membranes (from about 200 psi to about 1,200 psi).

3. Flow Sensor

In various aspects, the filtration system comprises a flow sensor, configured for determining at least one parameter associated with fluid flowing across a membrane deposited between the first chamber and the second chamber. The fluid flow sensor may be designed to indicate the instantaneous and average fluxes recorded by the filtration system. Temporal flux measurements may then be used to calculate the integral and derivative flux terms necessary for the control process.

4. Pressure Sensor

In various aspects, the filtration system comprises a pressure sensor. The pressure sensor can be configured to determine a pressure reading of the fluid flow across the membrane separating the first chamber from the second chamber. The pressure sensor may be configured in such a manner that a fluid to be measured is not retained. In a further aspect, the pressure sensor comprises a membrane and a pressure sensing section, which senses the pressure of the fluid which flows within the membrane. In a still further aspect, the pressure sensor is distinct and/or separate from the membrane.

5. Filtration Management System

In an aspect, the filtration system can comprise a filtration management system. In an aspect, the filtration management system is in communication with the pressure pump, the flow sensor, and the pressure sensor. The filtration management system can be configured to cause the pressure pump to apply a constant pressure on fluid flowing from the first chamber to the second chamber for a first predetermined time based on the pressure reading. Furthermore, the filtration management system can cause the pressure pump to reverse the constant pressure for a second predetermined time based on the at least one parameter. The reversed pressure can cause the flow of the fluid to move in the reverse direction across the membrane between the first chamber and the second chamber. The reversed pressure can also be a constant pressure.

C. Methods for Operating Fluid Filtration Management Systems in Training Mode

Figure 5:
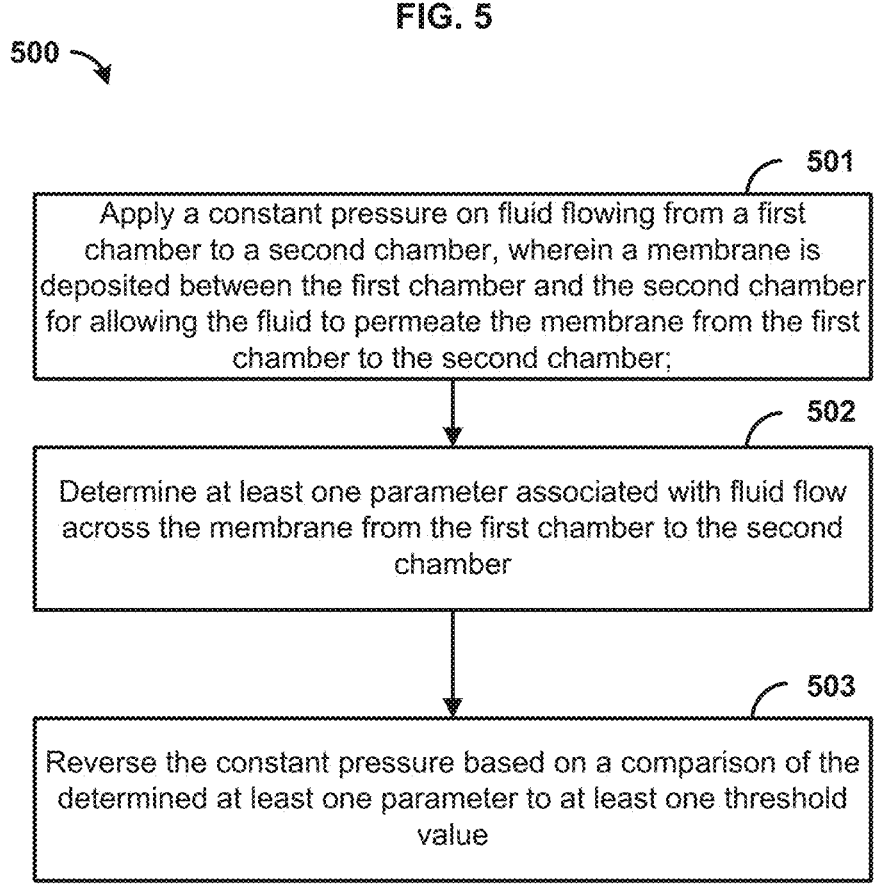
FIG. 5 shows a flowchart illustrating an example method for operating a filtration management system in training mode.

FIG. 5, illustrates a method 500 of a filtration management system. In step 501 a constant pressure can be applied on fluid flowing from a first chamber to a second chamber. In an aspect, the constant pressure can be applied by a pressure pump. In an aspect, a membrane can be deposited between the first chamber and the second chamber for allowing the fluid to permeate the membrane from the first chamber to the second chamber.

In step 502, at least one parameter can be determined that is associated with fluid flow across the membrane from the first chamber to the second chamber. In an aspect, a flow sensor can determine the at least one parameter. In an aspect, the at least one parameter can be one or more of a fluid flow velocity, a change rate of fluid flow velocity, a fluid volume permeate through the membrane for a predefined time period, fouling formed on the membrane. In an aspect, the fouling formed on the membrane can be determined via measuring electrical conductivity of the membrane. In another aspect, the fouling formed on the membrane can be determined via in-situ visual examination of the membrane surface.

In step 503, the constant pressure can be reversed based on a comparison of the determined at least one parameter to at least one threshold value. In an aspect, the filtration management system can cause the pressure pump to reverse the constant pressure when the threshold value has been met. In an aspect, the reversed pressure can be applied at a constant level and can be determined based on a predefined formula. In an aspect, the reversed pressure can be applied for a predefined time period. The predefined time period can be based on at least one measured factor. The measured factor can be an amount of fouling built up on the membrane on each cycle. After the reverse pressure has been applied to fluid for the predefined time period, the constant pressure can be reapplied in the original direction of fluid flow from the first chamber to the second chamber.

Intelligent process control by a filtration management system can involve some initial learning of the filtration system's response to a given stimulus (driving force). In membrane processes, this can be readily achieved during the first few filtration cycles by operating the filtration system at a fixed TMP and observing the ensuing flux decline behavior. At commissioning of a filtration system, the first few interactions of the feed water with the filtration system can provide excellent indicators of how the feedwater can foul the membrane, and how the filtration and backwash cycles need to be adapted to the specific feed water. Applying a preset TMP will lead to a certain flux decline behavior in the filtration system, which can be recorded over a preset filtration time before triggering a backwash.

Consider implementation of a filtration management system with four preset conditions: the initial TMP, which gives the initial flux, $J_0$; the forward filtration time, $t_{f,ini}$; the maximum allowable flux ratio, $J_N/J_f$; and the backwash ratio, raw. If the flux decline during this initial preset forward filtration time yields a flux ratio that is greater than the preset flux ratio, and following the subsequent backwash step, the flux is again recovered completely to attain the initial flux $J_0$, the preset conditions are maintained as adequate for the current operation. However, if the flux ratio attains a lower value than the preset ratio $J_N/J_f$ before $t_{f,ini}$, then the forward filtration cycle is stopped earlier, and the new filtration time $t_f < t_{f,ini}$ is selected for the next filtration cycle.

When the filtration time is shortened, the production of filtrate will be lower during the filtration cycle. Consequently, the backwash ratio will become higher. If the backwash ratio is greater than the preset limit, the process will be less economical as it produces a lower amount of water over a cycle. To adjust the backwash ratio, there are a few options, which could include modifying the backwash time and the backwash flux. One can then alter the backwash flux and run a second cycle consisting of a forward filtration and backwash step using the modified parameters from the first cycle.

Figure 6:
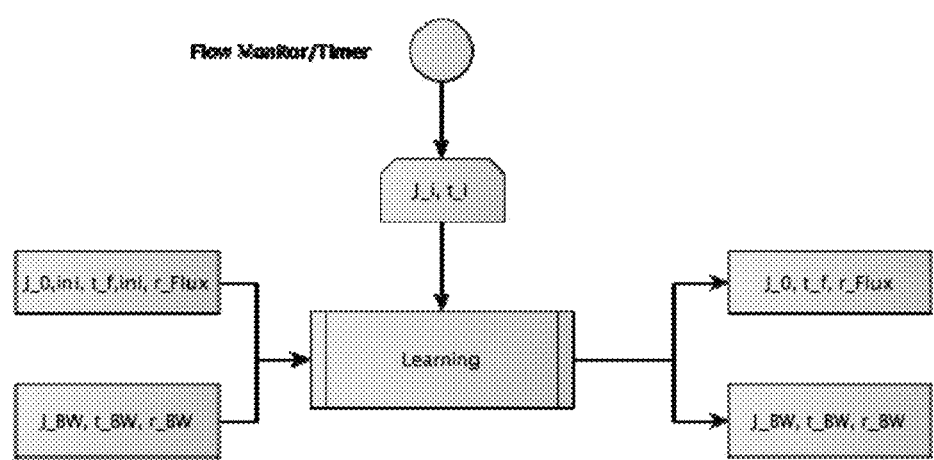
FIG. 6 shows a representative flowchart for the filtration management system.

FIG. 6 depicts the learning process flow diagram. The learning module is a data acquisition module and a comparator that measures the flux in real time, and compares it against the preset values (or values acquired in the previous steps of training). The preset values stored during a given filtration cycle are the initial flux ($J_{0,ini}$, which depends on the TMP set point), the filtration time ($t_{f,ini}$), and the flux ratio of the previous filtration cycle ($r_{flux} = J_N/J_0$). The reaming preset values are the backwash parameters, namely, the backwash time, the backwash flux, and the backwash ratio. The learning module records the flux vs. time data, and performs the following calculations in real time within the module:

1. The integral of the flux according to eq. (1)
3. The error estimate evaluated as:
2. The derivative of the flux according to eq. (6)

$$\epsilon(t_i) = K_p(J_i - J_{Av,ini}) + K_i\left[\int J_i dt - Q_{f,ini}\right] + K_d\left[\frac{dJ}{dt}\bigg|_i - \frac{J_N - J_{0,ini}}{t_{f,ini}}\right] \quad (7)$$

where $K_p$, $K_i$, and $K_d$ are the proportional, integral and the derivative gains, respectively. The error estimate is used to control the filtration time, and the TMP setting for the next filtration run. It should be noted that each term in Eq. (7) provides a more realistic representation of the mechanisms of flux decline in a membrane filtration process. The proportional term depicts how the local flux compares with the average flux of the previous cycles, the integral term depicts how the cumulative production from the current filtration cycle up to a time t, compares with the total production from the previous cycle, and the derivative term depicts how the instantaneous flux decline rate in the present filtration cycle compares with the overall flux decline rate in the previous filtration cycle.

Equation (7) is a general PID control algorithm for controlling the performance of a filtration system, and can be modified to act as any combination of proportional, integral, and derivative modes of process control. For example, setting the integral gain to zero, the process can be defined as a PD controller. It is also worth noting that the process control algorithm is defined in such a manner that the set points are updated after each filtration cycle to reflect the learned features of the fouling mechanism. Furthermore, the learning process can involve either of adjusting the applied TMP or adjusting the filtration time, or a combination thereof, to fine tune the filtration cycle. In many instances the initial TMP set point is chosen during the design of a filtration system having a membrane such that the fouling is not severe. In this respect, one can use the learning process to increase the TMP set point. When the TMP set point is adjusted, it may be more useful to consider the derivative inputs, as the applied pressure directly influences the flux decline rate. A higher TMP leads to a faster flux decline rate. On the other hand, when the filtration time is adjusted, weightage should be attributed to all three of the errors, namely the instantaneous flux, the integral of the flux (giving the throughput), and the derivative of the flux.

The overall goal of the learning process is to identify the flux decline kinetics for a fixed feedwater composition, keeping all other operating conditions fixed. The only parameters varied to tune the process control mechanisms are the applied TMP and the filtration time. In some instances the backwash flux and backwash times can also be adjusted.

D. Methods for Operating Fluid Filtration Management Systems in Control Mode

FIG. 7 illustrates a method 700 of a filtration management system according to various aspects. In step 701, a constant pressure can be applied on fluid flowing from a first chamber to a second chamber for a first predefined time. A membrane can be deposited between the first chamber and the second chamber for allowing the fluid to permeate the membrane from the first chamber to the second chamber. In an aspect, the first predefined time is can be a constant value. In an aspect, the first predefined time can be a value based on a predefined formula.

In step 702, the constant pressure can be reversed for a second predefined time. In an aspect, the second predefined time can be a constant value. In an aspect, the second predefined time can be based on a predefined formula. In step 703, the constant pressure can be reapplied for the first predefined time.

The control mode operation involves responding to sudden or anticipated variations of flux in the filtration system during operation, and performing a backwash or CIP at necessary intervals. The control mode is initiated after a few training cycles, once the process TMP, forward filtration time, and backwash parameters are established. The governing PID equation for this case can be written as $$\varepsilon(t_i) = K_p(J_{i,Av} - J_{Av,0}) + K_i\left[\int J_i dt - Q_{f,0}\right] + K_d\left[\frac{dJ}{dt}\bigg|_{i,Av} - \frac{dj}{dt}\bigg|_{Av,0}\right] \quad (8)$$

where, $$J_{i,Av} = \frac{1}{i}\sum_{1}^{i} J_i \quad (9)$$

$J_{Av,0}$ is the average flux from the previous time step, $Q_{f,0}$ is the cumulative filtrate volume (integral of the flux) from the previous filtration step, $$\frac{dJ}{dt_{i,Av}} = \frac{J(t_i) - J_0}{t_i} \quad (10)$$

and $$\frac{dJ}{dt}\bigg|_{Av,0} = \frac{J_N - J_0}{t_f} \quad (11)$$

is the linearized flux decline rate between the start and end of the previous filtration step.

Figure 8:
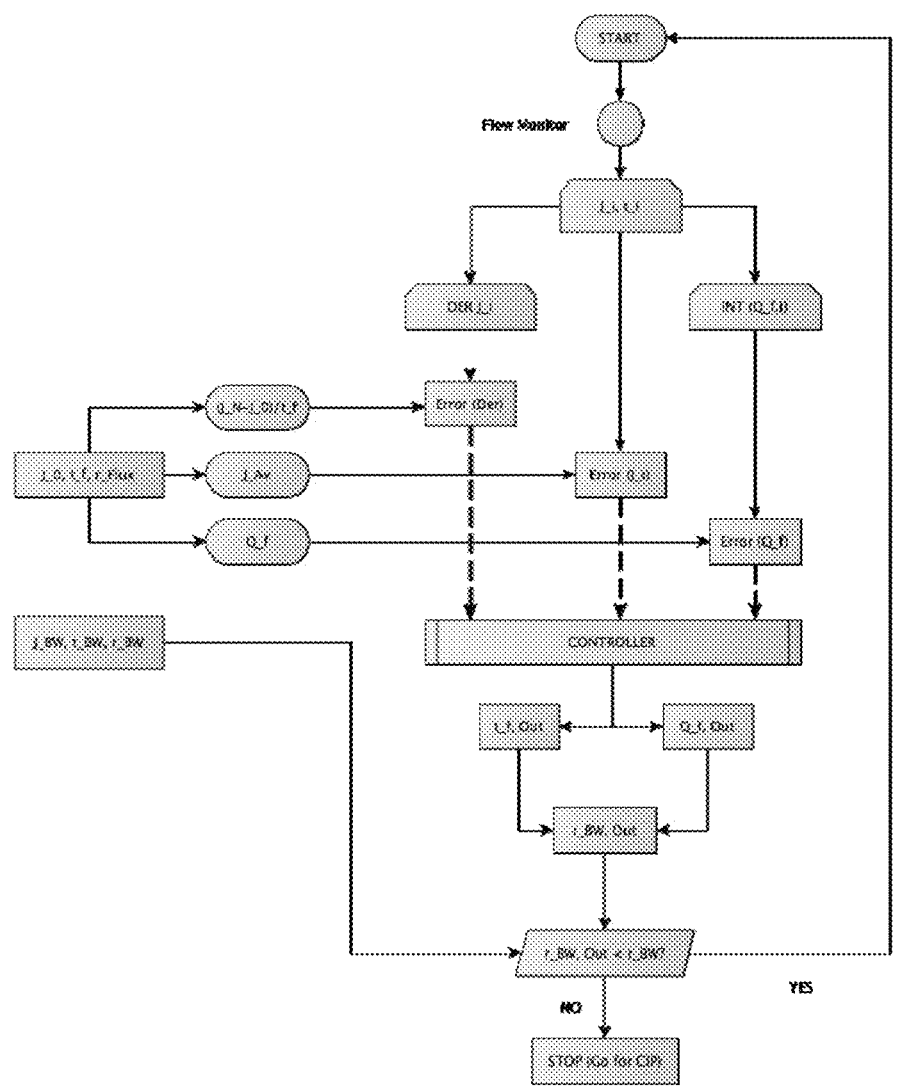
FIG. 8 shows a representative flowchart for the control mode operation of a filtration management system.

FIG. 8 depicts the normal mode of operation. During the control mode operation, the filtration management system will record the flux at regular time intervals. It is also assumed that once the TMP is established during the training period, it will not be further varied during the normal operation. During the normal operation, the flux will decrease with time following the same pattern learned by the filtration management system, and after a certain time interval, the filtration cycle will be stopped, backwash initiated, and then the filtration cycle restarted after the backwash. The process of controlling the filtration time and backwash sequence involves comparing the instantaneous flux, the derivative, and the integrated flux (the production) measured using the flow monitoring device against the average flux recorded by the filtration management system, the linearized rate of flux decline, and the cumulative production during the previous filtration step, respectively. The controller measures the errors for the proportional, derivative, and integral components, and determines the necessary action. For instance, when the cumulative production during the present filtration cycle becomes identical to the cumulative production from the previous cycle and the average flux decline rate of the present cycle becomes same as the previous cycle, the filtration management system triggers a backwash. This is the normal mode of operation when there is no variation in any other input or perturbation to the filtration system.

E. Methods for Operating Fluid Filtration Management Systems in Response to a Step Change in Filtrate Flow FIG. 9 illustrates a method 900 for operating a fluid filtration management system in response to a step change in filtrate flow. In step 901, a constant pressure can be applied on fluid flowing from a first chamber to a second chamber. In an aspect, a membrane is deposited between the first chamber and the second chamber for allowing the fluid to permeate the membrane from the first chamber to the second chamber.

In step 902, a threshold can be determined to be exceeded on a filtration system. In an aspect, the threshold can be a threshold based on a parameter such as, but not limited to, one or more of a fluid flow velocity, a change rate of fluid flow velocity, a fluid volume permeate through the membrane for a predefined time period, fouling formed on the membrane, combinations thereof, and the like.

In step 903, a backflow process can be initiated in response to determining that the threshold has been exceeded. In an aspect, the backflow process can be applied for a predefined time period. In an aspect, backflow process can comprise reversing the constant pressure. In an aspect, the reversed pressure can be a constant value. In an aspect, the reversed pressure can be determined based on a predefined formula.

If during operation, a slug of foulant attaches to the membrane and suddenly reduces its flux, causing a step decline in permeate flux. The measured instantaneous flux and the flux decline rate will change immediately as a response to this step change. The integral response (cumulative volume) will not be apparent immediately, but will manifest over several subsequent measurements. The filtration management system will now have multiple options to respond to the step change, whereas the action at the end of a decision process is to stop the filtration process, and trigger a backwash. In the proportional mode, the filtration management system will continue to record the flux and perform time averaging, and once the time average drops below the average flux of the previous cycle, backwash will be triggered.

In the derivative mode, the filtration management system will record the instantaneous derivative, and the mean linearized derivative, represented as Eq. (10). It is discernible that the instantaneous derivative response (the flux decline rate) will be to indicate a large error (infinite for a step function), and a control response solely based on the instantaneous derivative error will be too abrupt. However, the linearized derivative as in Eq. (10) will provide a more modest derivative error. If this linearized derivative becomes steeper than the linear derivative from the previous filtration cycle, then the process can trigger a backwash.

In the integral mode, the filtration management system will continue to calculate the cumulative production by integrating the instantaneous flux. However, the integral response will not be used for triggering the backwash. This response is used to calculate the backwash volume ratio, and to determine whether the backwash was effective, or whether the CIP should be invoked.

The filtration management system will respond by stopping the filtration process earlier, making the backwash more frequent, and under persistent adverse conditions (for instance, if the backwash cannot increase the flux back), to trigger a CIP.

It should be noted that the filtration management system may not involve using the PID error estimate to modify the TMP or any other parameter in the filtration cycle. It simply continues to accumulate the average flux, average derivative, and the cumulative flux and compare these with the values obtained in the previous filtration step. The process then stops the filtration once the average flux becomes equal to the average flux in the previous cycle, or the rate of flux decline becomes larger than the average flux decline rate in the previous step by some predetermined multiple. This passive mode of flux management allows the membrane to recover from any fouling event through changing the frequency of the backwash cycle. It does not aggravate the fouling by increasing the TMP to recover the flux. The process control methodology responds to any perturbation of flux by stopping the filtration process at an earlier time, cleaning the membrane more frequently, and if an adverse condition persists, stopping the filtration and triggering a CIP.

Figure 10:
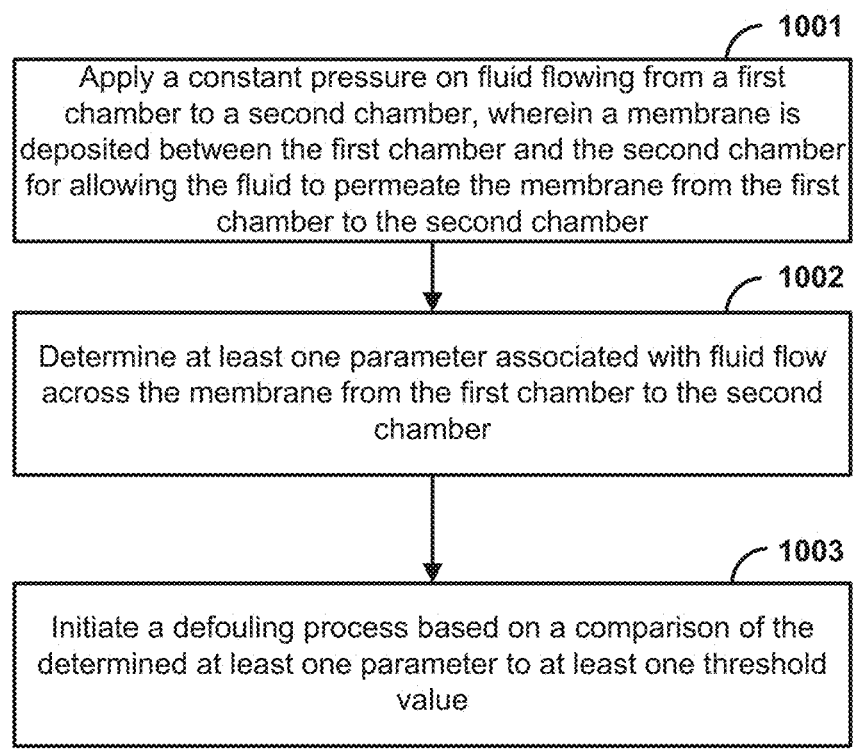
FIG. 10 shows a flowchart illustrating an example method for operating a filtration management system in response to a pulse change in flux.

F. Methods for Operating Fluid Filtration Management Systems in Response to a Pulse Change in Filtrate Flow FIG. 10 illustrates a method 1000 for operating a filtration management system in response to a pulse change in filtration flow. In step 1001, a constant pressure can be applied on fluid flowing from a first chamber to a second chamber, wherein a membrane is deposited between the first chamber and the second chamber for allowing the fluid to permeate the membrane from the first chamber to the second chamber.

In step 1002, at least one parameter can be determined associated with fluid flow across the membrane from the first chamber to a second chamber.

In step 1003, a defouling process can be initiated based on a comparison of the determined at least one parameter to at least one threshold value. In an aspect, the defouling process comprises a backwash process. In an aspect, the defouling process comprises a chemical cleaning process. In an aspect, the defouling process comprises a pressure pulsing process. In an aspect, the defouling process comprises an air scouring process. In an aspect, the defouling process comprises a chemical pulse process. In an aspect, the defouling process comprises a feed flow reversal process. In an aspect, the defouling process comprises a clean-in-place process.

If the flux decreases suddenly and then recovers after some time (a pulse function), the response of the filtration system should be to increase the frequency of the backwash, lowering the filtration time during the pulse, and then gradually recover back to a lower frequency backwash and longer filtration steps after the original operating conditions are restored. Such a condition can be triggered by incidents such as an increase in feed solute concentration for a short duration, and conventional flux control mechanisms exacerbates membrane fouling during these incidents by increasing the TMP in response to the flux decline and aggravating the fouling process. In the present method, the constant pressure operation does not change the driving force to aggravate the fouling.

Figure 11:
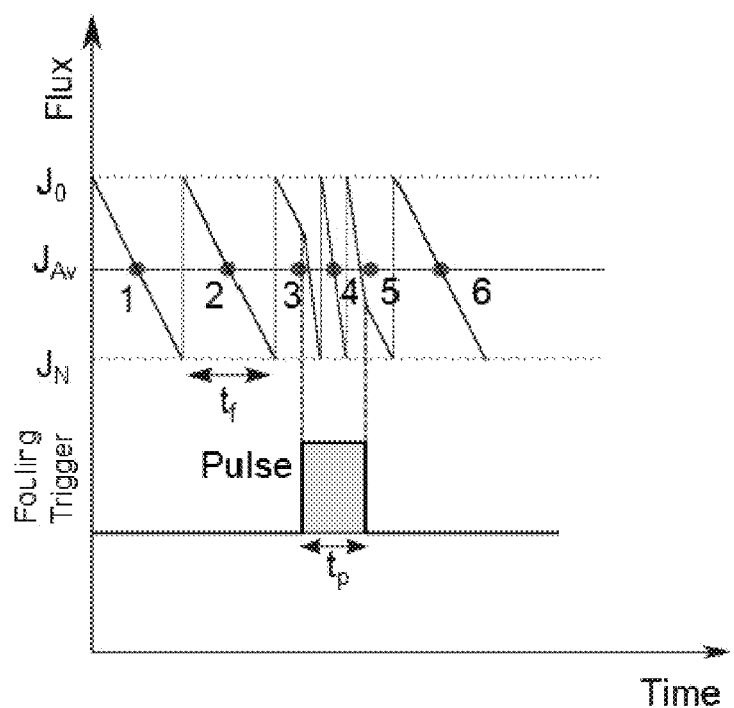
FIG. 11 shows a representative schematic depiction of the response of a filtration management system to a pulse event of duration $t_p$.

FIG. 11 depicts a typical sequence of filtration cycles during a pulse event, which triggers a sharper flux decline. The figure plots the flux in the vertical axis against time. To demonstrate the situation clearly and explain the concept of intelligent management of the flux decline behavior, assume that the flux decline behavior is linear. Furthermore, the flux varies in each filtration cycle between the initial flux $J_0$ and the final flux $J_N$ over each filtration cycle, with the backwash restoring the flux to the initial flux after each cycle. These simplifying assumptions can be relaxed for different applications. For instance, the flux recovery may not be complete after a backwash. Also, the flux decline behavior may not be linear. The average flux during each filtration cycle is denoted by the circles, and has a fixed value $J_{Av}$.

Assume a pulse event changes the rate of flux decline at some point during the third filtration cycle. The faster rate of flux decline due to this pulse event makes the slope of the flux vs. time curve steeper. At this different rate of flux decline, the minimum flux $J_N$ is attained earlier during this cycle. The average flux of this cycle is still $J_{Av}$, although the average value is attained earlier. This implies that the filtration cycle time $t_{f,3} < t_{f,2}$. The cumulative production of filtration is also lower in this cycle. Once, $J_N$ is attained, the backwash commences, and after the backwash the initial flux of the fourth cycle. $J_0$ is attained. However, in the fourth cycle, the rate of flux decline is larger, and consequently the average flux and $J_N$ are attained earlier than the previous cycle. In other words, $t_{f,4}$ is smaller than $t_{f,3}$. Furthermore, the cumulative production of filtrate is also lower from the filtration cycle 4. The accelerated fouling due to the pulse event causes the duration of the filtration cycles to decrease, and the frequency of the backwash cycles to increase.

In cycle 5, the pulse event subsides, and the original rate of flux decline is restored. This immediately increases the filtration time compared to cycle 4. In cycle 6, the original parameters of the first filtration cycle are restored. Thus, pulse events triggering accelerated flux decline reduces the duration of the filtration cycles, and increases the frequency of the backwash cycles. Although this lowers the production of filtrate as a response to any type of a perturbation that causes membrane fouling, the mechanism prevents the membrane from fouling irreversibly or aggressively.

Figure 12:
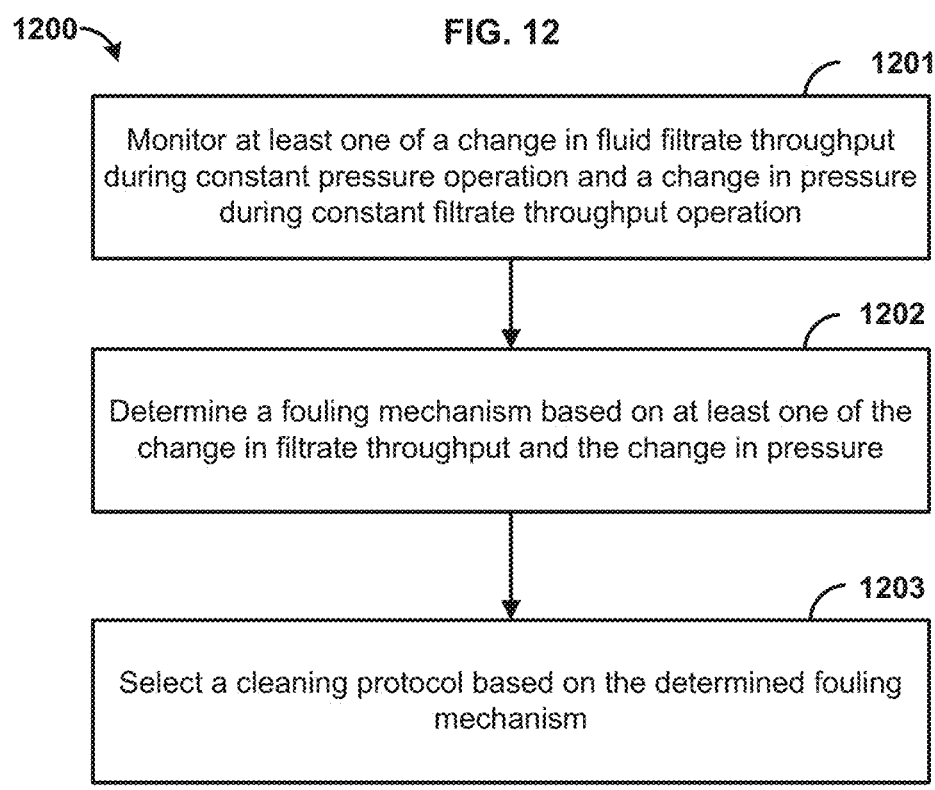
FIG. 12 shows a flowchart illustrating an example method for operating a filtration management system.

FIG. 12 illustrates a method 1200 of a filtration management system. In step 1201, at least one of a change in fluid filtrate throughput during constant pressure operation and a change in pressure during constant filtrate throughput operation can be monitored. In an aspect, monitoring a change in fluid filtrate throughput can comprise measuring flux across a membrane over a predefined period of time. As an example, the change in flux can be measured via a flow sensor. In an aspect, monitoring a change in pressure can comprise measuring pressure over a predefined period of time. As an example, the change in pressure can be measured via a pressure sensor.

In step 1202, a fouling mechanism can be determined based on at least one of the change in filtrate throughput and the change in pressure. In an aspect, determining a fouling mechanism can comprise performing a mathematical analysis of the change in flux and/or change in pressure according to one or more predetermined fouling models. As an example, the one or more predetermined fouling models can comprise a Hermia's model, a modified Hermia's model, or resistance-in-series model. In an aspect, determining a fouling mechanism can comprise performing a mathematical analysis of the change in flux and/or change in pressure according to one or more predetermined fouling models. As an example, the one or more predetermined fouling models can comprise a Hermia's model, a modified Hermia's model, or resistance-in-series model. In an aspect, the fouling mechanism can comprise concentration polarization, organic adsorption of chemically-active molecules, scale due to precipitation of salts and hydroxides, cake and pore blocking due to deposition of large suspended particles or small colloidal particles, gel-formation due to deposition of inert macromolecules, bio-fouling due to deposition and growth of biologically active organisms, and the like.

Equation 12 describes an effect of membrane fouling on flux decline as the accumulation of resistances that impede flow for a given driving force:

$$J = \frac{\Delta P}{\mu R tot} = \frac{\Delta P}{\mu(R_m + R_{cp} + R_a + R_p + R_g)} \quad (12)$$

where J is the permeate flux through the membrane, $\Delta P$ is the transmembrane pressure driving force, $\mu$ is the fluid viscosity, $R_{tot}$ is the total hydraulic resistance, $R_m$ is the intrinsic membrane resistance, $R_{cp}$ is the resistance caused by concentration polarization, $R_a$ is the resistance caused by solute adsorption, $R_p$ is the resistance caused by pore blocking and cake formation, and $R_g$ is the resistance caused by surface gel formation.

Figure 13:
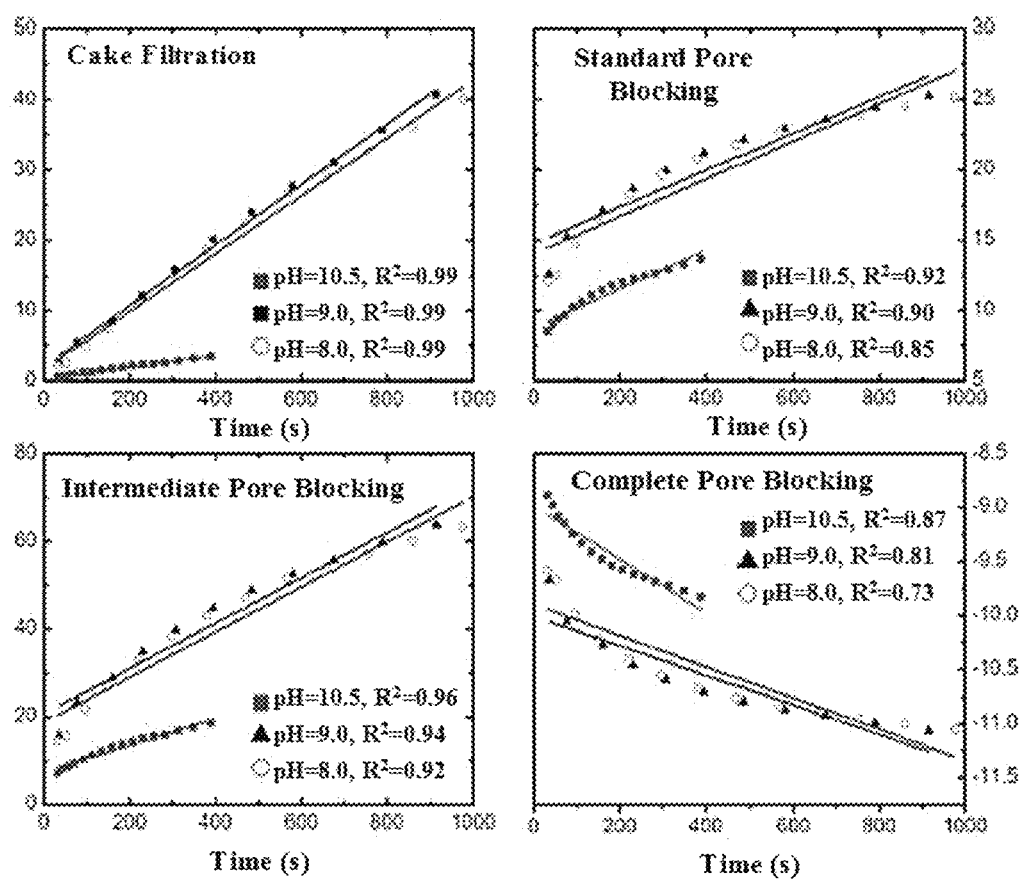
FIG. 13 shows solutions for different fouling mechanism and a flux vs. time curve subjected to a fit test to determine a specific observed particle fouling mechanism.

In an aspect, flux-pressure curve can be uniformly linear when no fouling has occurred, as only intrinsic membrane resistance is a factor. However, the onset of fouling can be reflected in a change in slope of varying degrees depending on the specific mechanism of fouling and their effect on the added total resistance to permeate flow. For example, a specific mechanism of particle fouling can be determined by fitting the flux vs. time curve to a series of pre-existing fouling models following the solution to Equations 13 and 14:

$$\frac{D^2 t}{dU^2} = k\left(\frac{dt}{dU}\right)^n \quad (13)$$

where t is the filtration time, k and n are constants that characterize the filtration process and U is either the varying permeate volume V, or transmembrane pressure, $\Delta P$ depending on constant pressure or constant flux operation, respectively. Therefore, by plotting $d^2t/dU^2$ against $dt/dU$ and determining the value of the blocking index n, different blocking mechanisms can be identified from a single plot. FIG. 13 shows solutions for different fouling mechanism and a single flux vs. time curve subjected to a fit test to determine the specific observed particle fouling mechanism (Maiti, Sadrezadeh et al. 2012). In addition, a general equation for cross-flow filtration by modifying a Hermia empirical model may be used:

$$-\frac{dJ_p}{dt} = K_{CF}(J_p - J_{pss})J_p^{2-n} \quad (14)$$

where $J_p$ is the permeate flux (m/s), t is the filtration time (s), $K_{CF}$ is the phenomenological coefficient dependent on the specific fouling mechanism, $J_{pss}$ is the steady-state permeate flux (m/s), and n is, again, the blocking index where n=2, 1.5, 1 and 0 for complete pore blocking, intermediate pore constriction, standard pore blocking, and cake filtration/gel formation, respectively. An example of the assessment of membrane fouling using these models is also seen in (Chang, Yang et al. "Assessing the fouling mechanisms of high-pressure nanofiltration membrane using the modified Hermia model and the resistance-in-series model" *Separation and Purification Technology* 79 (2011) 329-336). Thus, an intelligent learning process can perform a real-time data analysis of the empirically generated flux/pressure vs. time curves to determine what fouling mechanism is in effect and the most effective and economical cleaning process to be employed.

In step 1203, a cleaning protocol can be selected based on the determined fouling mechanism. In an aspect, determining the cleaning protocol can comprise selecting a cleaning method and one or more parameters associated with the cleaning method. As an example, the cleaning method can comprise a backflush method. As an example, the one or more parameters can comprise one or more of a pressure, a duration, a flow rate, a temperature, a specific chemical additive, and a dose of the specific chemical additive. In an aspect, the specific chemical additive can comprise one or more of an acid, a base, an oxidant, a chelating agent, and the like.

Different types of cleaning protocol can be employed for fouling control; however, efficacy of a given cleaning protocol can be highly dependent on the foulant to be removed. Table 2 pairs the various types of membrane foulants with the most effective cleaning technique:

TABLE 2

| Foulant/Flux Decline Mechanism | In-Situ Cleaning Technique |
| --- | --- |
| Concentration Polarization | Enhance surface mass transfer by increasing cross flow velocity, feed flow reversal, and/or high frequency permeate backwashing |
| Organic adsorption by chemically-active molecules | Thermally-enhanced CEB with caustic, oxidant, and/or surfactant additives |
| Scale due to the precipitation of salts and hydroxides | Hardness and Metal Oxides - CEB with acid and/or chelating additives Silica - CEB with caustic additives |
| Cake and pore blocking due to the deposition of large suspended and small colloidal particles | Inorganic - High pressure permeate backflush or CEB with acid additives Organic - High pressure CEB with caustic and/or oxidant additives |
| Gel-formation due to the deposition of inert macromolecules | High pressure permeate backflush or thermally-enhanced high pressure CEB with caustic, oxidant, and/or surfactant additives |
| Bio-fouling by the deposition and growth of biologically active organisms | CEB with chemical disinfectant and/or enzymatic additives |

In an aspect, select filtration systems, such as NF and RO, suffer from heterogeneous and spatially-dependent fouling whose effects are not effectively captured by monitoring full-scale system data. In these applications, the embodiment of the intelligent filtration management system will include communication with strategically deployed independent fouling monitors along the full-scale filtration system. Monitoring the performance data of the fouling monitors will provide the intelligent filtration management system greater sensitivity to respond to early signs of fouling and flux decline.

In an aspect, diligent monitoring and testing of filter performance and integrity can be vital in developing a clear understanding of remaining useful life of the filter and determining when replacement will be necessary. For example, a means of membrane integrity testing for immediate failure response can comprise visual monitoring during targeted integrity testing. A video capture can be used for real time monitoring of one or more membrane elements, thereby detecting any integrity breach for suspicious membrane elements.

In a specific aspect, the filtration management system can continuously monitor permeate quality of one or more membrane elements. When the integrity of a specific membrane becomes in question, the filtration management system can isolate the one or more elements for an in situ bubble integrity test. Once an integrity breach is detected, the filtration management system can send an appropriate alert and isolate one or more defective membranes for maintenance, thus, maximizing the speed of repair and minimizing the impact on overall filtration system performance. These disclosed systems and methods can also be expanded to incorporate other system metrics for real-time system diagnostics and maintenance response in the event of filtration system failure due to equipment malfunction, leaks, and the like.

In an aspect, the methods and systems can perform a real-time trend analysis of one or more measured performance metrics. The methods and systems can monitor a given plant's operational diagnostics, such as a filter's remaining life and expected replacement date. For example, the real-time trend analysis can be achieved by analyzing permeate water quality trends to determine if and/or when, a system integrity breach occurs. In an aspect, a filtering and regression analysis can be used to extrapolate when a predetermined minimum permeability for a given filtration system is reached. Once it is determined that a legitimate integrity breach has occurred, an instantaneous and automatic response can commence to minimize the system downtime and prevent a total system failure. In an aspect, the disclosed systems and methods can be applicable for any filtration system regardless of operation at constant flux or constant pressure.

Figure 14:
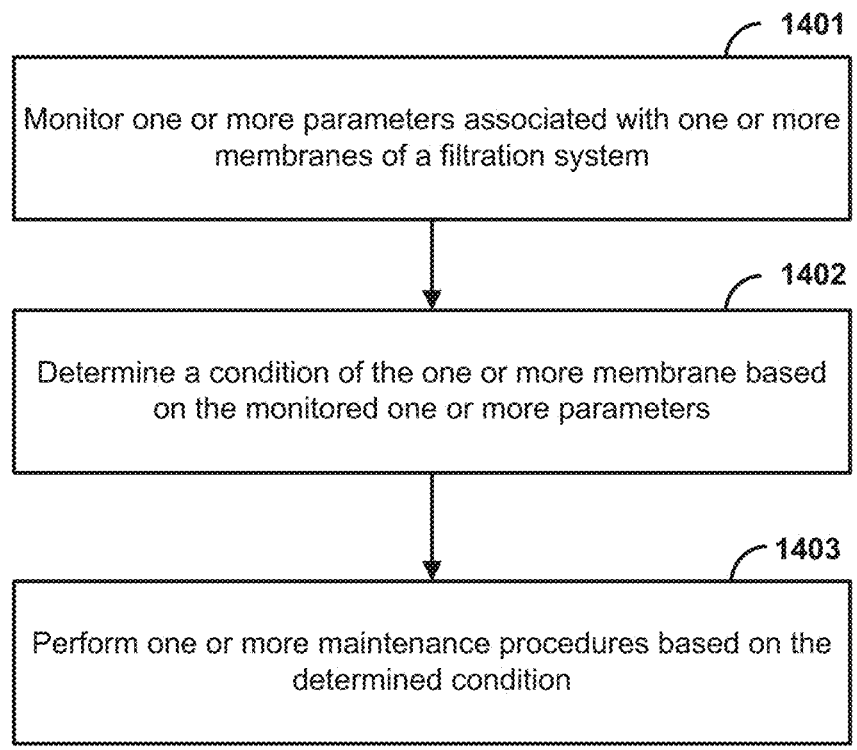
FIG. 14 shows another flowchart illustrating an example method for operating a filtration management system.

FIG. 14 illustrates a method 1400 of a filtration management system. In step 1401, one or more parameters can be monitored that are associated with one or more filters of a filtration system. In an aspect, the one or more parameters can comprise a transfilter pressure, a permeate flux, a permeate turbidity, a permeate salinity, a permeate pH, a permeate salinity, a permeate color, a permeate hardness, a permeate total organic concentration, concentration of one or more predefined permeate ions, concentration of one or more predefined organic molecules. Many of these parameters can be measured in-situ, such as pH, salinity, color, and turbidity; however, some may require periodic sampling and ex-situ measurement, such as concentrations of target inorganic and organic molecules. For example, color and turbidity can be measured spectrophotometrically by tracking the amount of light that passes through a permeate or feed solutions using an integrated probe. Whereas target concentrations of inorganic and organic constituents can be measured using independent instruments, such as an inductively coupled plasma optical emission spectrometer, a gas chromatography-mass spectrometer, and the like.

In step 1402, a condition can be determined of the one or more filters based on the monitored one or more parameters. In an aspect, when determining the condition of the one or more filters based on the monitored one or more parameters, a statistical analysis can be performed based on the monitored one or more parameters. In an aspect, the statistical analysis can comprise filtering and smoothing analysis, regression and trend analysis. As an example, the filtering and smoothing analysis can comprise Wiener analysis, Kalman analysis, Butterworth analysis, Chebyshev analysis, Elliptical analysis, Bessel analysis, Gaussian analysis, moving average analysis, and Savitsky-Golay analysis. As an example, the regression and trend analysis can comprise linear regression analysis, multiple regression analysis, factorial regression analysis, polynomial regression analysis, response surface regression, mixture surface regression, one-way analysis of variance (ANOVA), main effect ANOVA analysis, factorial ANOVA analysis, covariance analysis, homogeneity of slopes analysis, linear fit analysis, least-squares fit analysis, Kendell test analysis, Sen's slope test analysis, Wilcoxon-Mann-Whitney step trend analysis, genetic and neural network analysis, combinations thereof, and the like.

In an aspect, determining the condition of the one or more filters can comprise estimating a lifetime of the one or more filters. In an aspect, a notification can be sent if the estimated lifetime is below a predefined threshold (e.g., two days). As an example, the notification can comprise an estimated replacement date for the one or more filters. The filter condition can be monitored with respect to specific filter properties, such as permeability (e.g., transfilter pressure and filtrate flow rate), degree of irreversible fouling, and integrity testing. The filter condition can also be monitored with respect to operating parameters and performance metrics, such as applied pressure, flux maintenance (e.g., mechanical and chemical maintenance, clean-in-place maintenance), and filtrate quality (e.g., turbidity). The real-time recorded value of these metrics is compared to a predetermined threshold value to calculate the remaining lifetime of the module. Permeability measurements can be recorded in real-time and used in a statistical model to extrapolate the predicted permeability trend with time. The amount of time predicted by the model for the current filter to achieve the threshold permeability is the module lifetime remaining. When the lifetime remaining value reaches a predetermined threshold, then the filter can be replaced.

In an aspect, determining a condition of the one or more filters can comprise determining a type of the one or more filters. As an example, the type of the one or more filters comprises a tubular polymeric membrane, a hollow fiber membrane, a spiral wound membrane, a tubular ceramic membrane, combinations thereof, and the like.

In an aspect, the condition of the one or more filters can comprise an upcoming integrity breach, a detected integrity breach, an upcoming permeability loss, and a detected permeability loss.

In step 1403, one or more maintenance procedures can be performed based on the determined condition. One or more maintenance procedures can be used according to the condition. In an aspect, the one or more maintenance procedures can comprise a filter isolation procedure, a filter repair procedure, a filter replacement procedure, a filter pinning procedure, combinations thereof and the like.

In an aspect, a response to a specific filter condition, whether caused by an integrity breach or permeability loss, can be varied depending on the type of filter a system used. For example, when fiber failure occurs for hollow fiber membranes, the failed fiber membranes can be isolated by inserting small pins or epoxy in the end(s) of the broken fiber or can be permanently removed from service. As another example, spiral-wound nanofiltration and reverse osmosis membranes can be replaced after failure. Considering the high frequency and costs associated with filter failure and replacement, early detection of failure and proper preparation can be highly valuable in economically efficient replacement practices.

Figure 15:
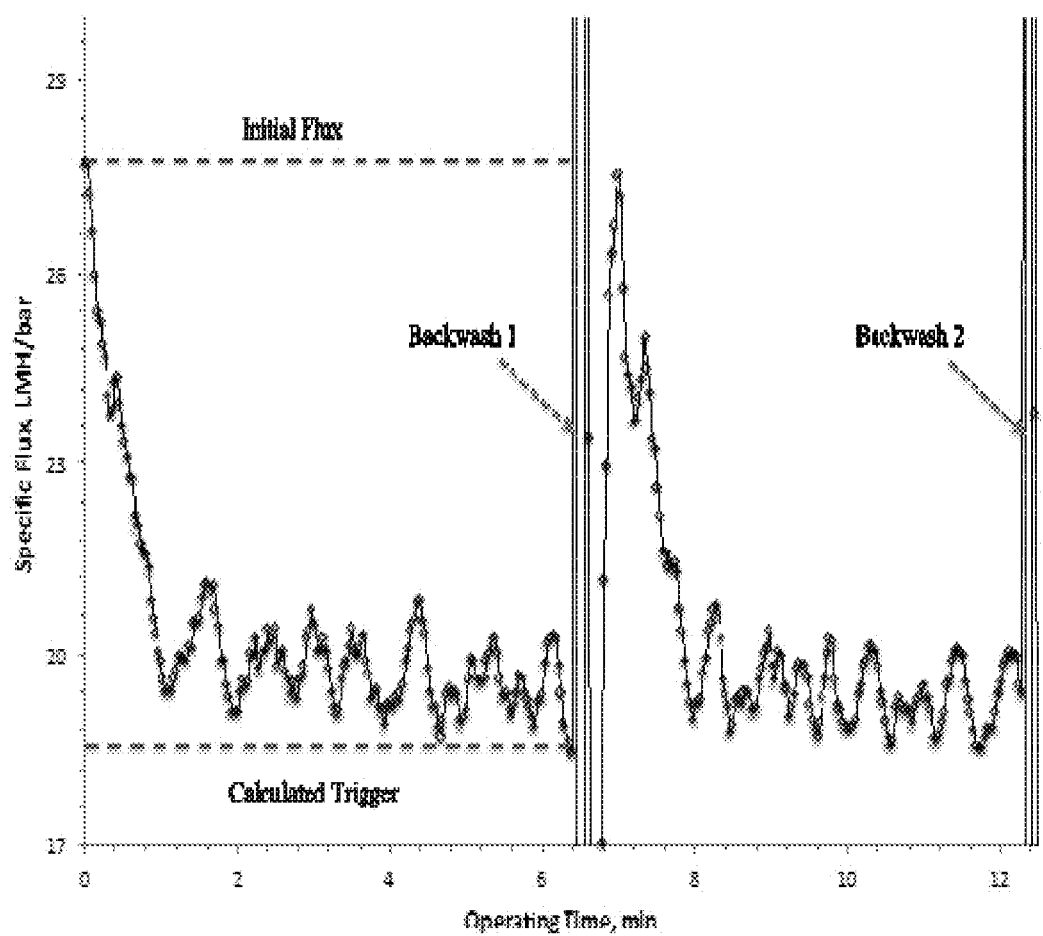
FIG. 15 shows experimental results utilizing a filtration management system.
Figure 16:
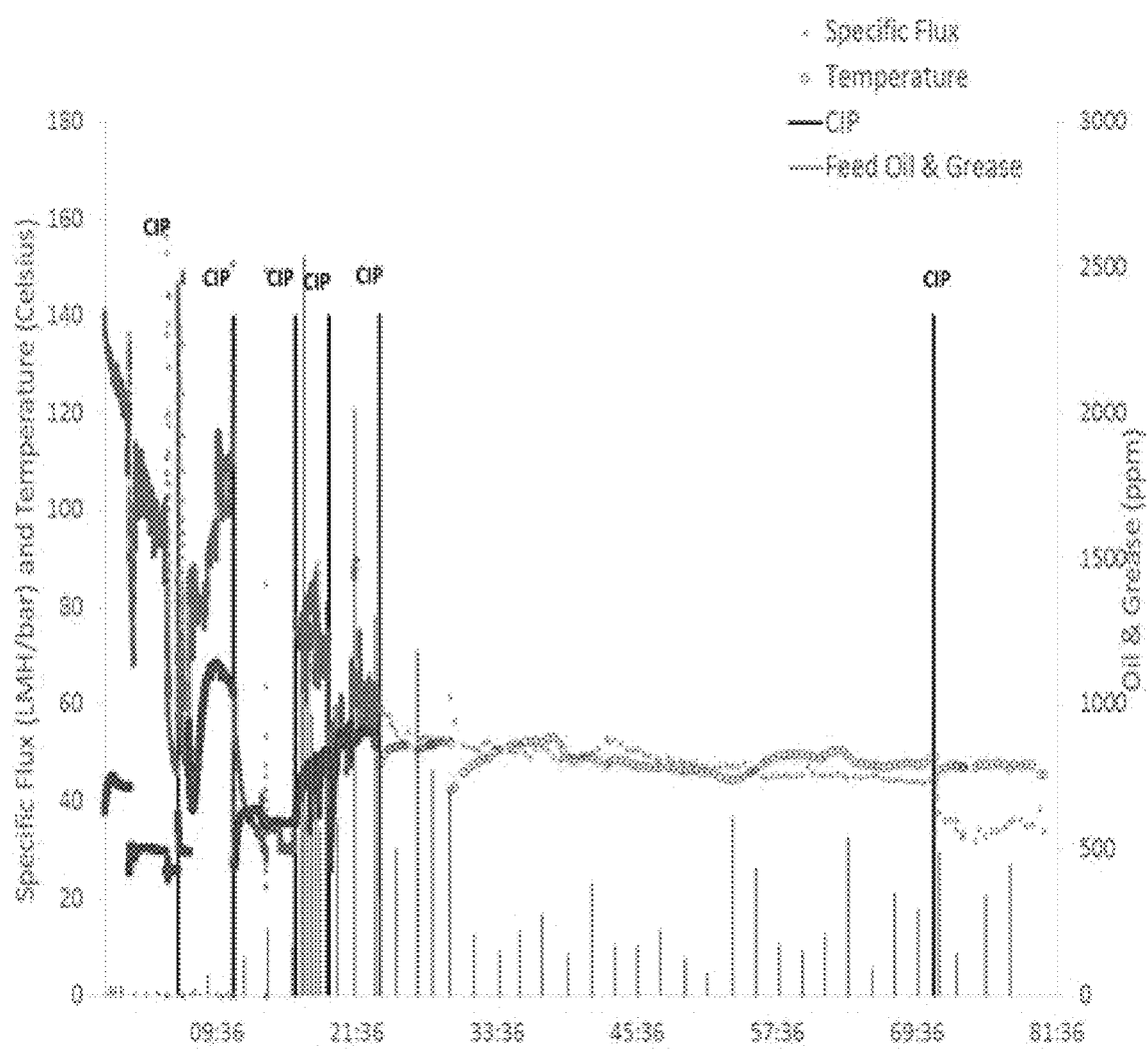
FIG. 16 shows experimental results utilizing a filtration management system.

FIG. 15 and FIG. 16 illustrate experimental results using the filtration management system and methods described herein. The programmable logic controller was programmed to operate a filtration system at a constant applied pressure. The flux of the filtration system was allowed to decay naturally until a pre-calculated minimum was reached, which would then trigger a maintenance procedure, e.g., filtrate backwashing, as illustrated in FIG. 15. Unlike conventional filtration processes that utilize a predefined maintenance procedure frequency, the filtration management system can be adapted to environmental conditions by allowing filtration system performance to dictate the appropriate maintenance procedure such as a cleaning protocol. FIG. 16 shows how the filtration management system is, therefore, able to adapt to dramatic variability in environmental conditions, such as feed water quality and temperature. Specifically, dramatic swings in oil concentration and water temperature can result in significant flux loss during the initial start-up phase. In response, the filtration management system can increase the frequency of backwashing as well as the number of chemical washes, each denoted as a "clean-in-place" (CIP). The filtration management system eventually stabilized the membrane performance after approximately 24 hours of operation, which resulted in minimized flux decline and CIP frequency.

Figure 17:
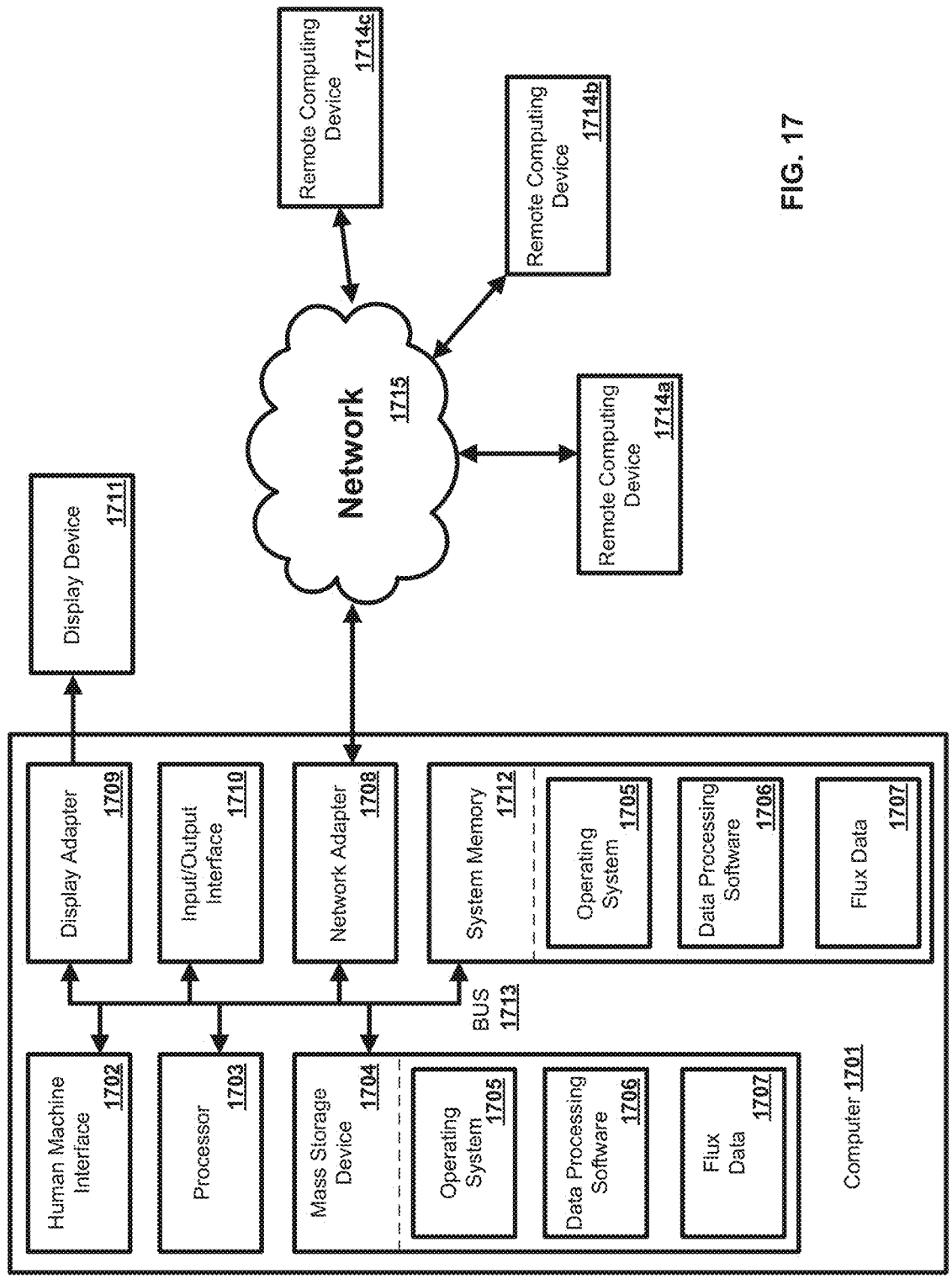
FIG. 17 illustrates an example computing device in which the disclosed methods and systems can operation.

In an exemplary aspect, the methods and systems can be implemented on a computer 1701 as illustrated in FIG. 17 and described below. Similarly, the methods and systems disclosed can utilize one or more computers to perform one or more functions in one or more locations. FIG. 17 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 1701. The computer 1701 can comprise one or more components, such as one or more processors 1703, a system memory 1712, and a bus 1713 that couples various components of the computer 1701 including the one or more processors 1703 to the system memory 1712. In the case of multiple processors 1703, the system can utilize parallel computing.

The bus 1713 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1713, and all buses specified in this description can also be implemented over a wired or wireless network connection and one or more of the components of the computer 1701, such as the one or more processors 1703, a mass storage device 1704, an operating system 1705, data processing software 1706, flux data 1707, a network adapter 1708, system memory 1712, an Input/Output Interface 1710, a display adapter 1709, a display device 1711, and a human machine interface 1702, can be contained within one or more remote computing devices 1714a,b,c at physically separate locations, connected through buses of this form, in effect implementing a fully distributed system.

The computer 1701 typically comprises a variety of computer readable media. Exemplary readable media can be any available media that is accessible by the computer 1701 and comprises, for example and not meant to be limiting, both volatile and non-volatile media, removable and non-removable media. The system memory 1712 can comprise computer readable media in the form of volatile memory, such as random access memory (RAM), and/or non-volatile memory, such as read only memory (ROM). The system memory 1712 typically can comprise data such as flux data 1707 and/or program modules such as operating system 1705 and data processing software 1706 that are accessible to and/or are operated on by the one or more processors 1703.

In another aspect, the computer 1701 can also comprise other removable/non-removable, volatile/non-volatile computer storage media. The mass storage device 1704 can provide non-volatile storage of computer code, computer readable instructions, data structures, program modules, and other data for the computer 1701. For example, a mass storage device 1704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1704, including by way of example, an operating system 1705 and data processing software 1706. One or more of the operating system 1705 and data processing software 1706 (or some combination thereof) can comprise elements of the programming and the data processing software 1706. Flux data 1707 can also be stored on the mass storage device 1704. Flux data 1707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 1715.

In an aspect, the user can enter commands and information into the computer 1701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 1703 via a human machine interface 1702 that is coupled to the bus 1713, but can be connected by other interface and bus structures, such as a parallel port, game port, an IEEE 1394 Port (also known as a Firewire port), a serial port, network adapter 1708, and/or a universal serial bus (USB).

In yet another aspect, a display device 1711 can also be connected to the bus 1713 via an interface, such as a display adapter 1709. It is contemplated that the computer 1701 can have more than one display adapter 1709 and the computer 1701 can have more than one display device 1711. For example, a display device 1711 can be a monitor, an LCD (Liquid Crystal Display), light emitting diode (LED) display, television, smart lens, smart glass, and/or a projector. In addition to the display device 1711, other output peripheral devices can comprise components such as speakers (not shown) and a printer (not shown) which can be connected to the computer 1701 via Input/Output Interface 1710. Any step and/or result of the methods can be output in any form to an output device. Such output can be any form of visual representation, including, but not limited to, textual, graphical, animation, audio, tactile, and the like. The display 1711 and computer 1701 can be part of one device, or separate devices.

The computer 1701 can operate in a networked environment using logical connections to one or more remote computing devices 1714a,b,c. By way of example, a remote computing device 1714a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1701 and a remote computing device 1714a,b,c can be made via a network 1715, such as a local area network (LAN) and/or a general wide area network (WAN). Such network connections can be through a network adapter 1708. A network adapter 1708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1705 are illustrated herein as discrete blocks, although it is recognized that such programs and components can reside at various times in different storage components of the computing device 1701, and are executed by the one or more processors 1703 of the computer 1701. An implementation of data processing software 1706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the methods and/or systems disclosed herein. It is intended that the specification and examples be considered as exemplary only, with a true scope and spirit of the disclosure being indicated by the following claims.

What is claimed is:

1. A method comprising:
    monitoring, for a current filtration cycle, at least one of a change in fluid filtrate throughput during constant pressure operation or a change in pressure during constant filtrate throughput operation;
    determining a fouling mechanism based on at least one of a determination that the change in fluid filtrate throughput for the current filtration cycle is greater than a change in fluid filtrate throughput for a previous filtration cycle or a determination that the change in pressure for the current filtration cycle is greater than a change in pressure for a previous filtration cycle;
    selecting a cleaning protocol based on the determined fouling mechanism; and
    performing a cleaning procedure according to the selected cleaning protocol.

2. The method of claim 1, further comprising:
    capturing video of one or more membrane elements.

3. The method of claim 1, wherein monitoring a change in fluid filtrate throughput comprises measuring filtrate flow over a predefined period of time.

4. The method of claim 1, wherein determining a fouling mechanism comprises a mathematical analysis of the change in fluid filtrate throughput according to one or more predetermined fouling models.

5. The method of claim 4, wherein the one or more predetermined fouling models comprises one or more of a Hermia's model, a modified Hermia's model, or a resistance-in-series model.

6. The method of claim 1, wherein the fouling mechanism comprises one or more of concentration polarization, organic adsorption of chemically-active molecules, scale due to precipitation of salts and hydroxides, cake and pore blocking due to deposition of large suspended particles or small colloidal particles, gel-formation due to deposition of inert macromolecules, or bio-fouling due to deposition and growth of biologically active organisms.

7. The method of claim 1, wherein selecting the cleaning protocol comprises selecting a cleaning method and one or more parameters associated with the cleaning method.

8. The method of claim 1, wherein monitoring a change in pressure comprises measuring pressure over a predefined period of time.

9. The method of claim 1, wherein determining a fouling mechanism comprises a mathematical analysis of the change in pressure according to one or more predetermined fouling models.

10. The method of claim 1, wherein the cleaning procedure comprises one or more of a filter cleaning procedure, a filter isolation procedure, a filter repair procedure, a filter replacement procedure, or a filter pinning procedure.

11. A method comprising:
    monitoring an instantaneous change in one or more parameters associated with one or more membranes of a filtration system;
    determining a fouling mechanism based on the instantaneous change in the one or more parameters;
    selecting a cleaning protocol based on the determined fouling mechanism; and
    performing a cleaning procedure according to the selected cleaning protocol.

12. The method of claim 11, wherein the one or more parameters comprise a change in fluid filtrate throughput during constant pressure operation.

13. The method of claim 12, wherein determining a fouling mechanism comprises fitting a representation of a change in fluid filtrate throughput during constant pressure operation with respect to time to a series of pre-determined fouling mechanism models.

14. The method of claim 11, wherein the one or more parameters comprise one or more of a transfilter pressure drop, a filtrate flow rate, a filtrate turbidity, a filtrate salinity, a filtrate pH, a filtrate color, a filtrate hardness, a filtrate total organic concentration, a filtrate microbial count, a feed microbial count, a concentration of one or more predefined filtrate, feed, or concentrate ions, or a concentration of one or more predefined filtrate, feed, or concentrate non-ionic molecules.

15. The method of claim 11, further comprising:
    determining that a current flux decline rate associated with the one or more membranes of the filtration system is greater than a prior flux decline rate associated with the one or more membranes of the filtration system.

16. The method of claim 11, wherein the fouling mechanism comprises one or more of concentration polarization, organic adsorption of chemically-active molecules, scale due to precipitation of salts and hydroxides, cake and pore blocking due to deposition of large suspended particles or small colloidal particles, gel-formation due to deposition of inert macromolecules, or bio-fouling due to deposition and growth of biologically active organisms.

17. The method of claim 11, wherein the one or more parameters comprise a change in pressure during constant filtrate throughput operation.

18. The method of claim 17, wherein determining a fouling mechanism comprises a mathematical analysis of the change in pressure according to one or more predetermined fouling models.

19. The method of claim 11, wherein determining a fouling mechanism comprises a mathematical analysis of the change in fluid filtrate throughput according to one or more predetermined fouling models.

20. The method of claim 11, wherein the cleaning procedure comprises one or more of a filter cleaning procedure, a filter isolation procedure, a filter repair procedure, a filter replacement procedure, or a filter pinning procedure.

21. A non-transitory computer-readable storage medium comprising processor-executable instructions that, when executed by a processor of a computing device, cause the computing device to:
cause a flow sensor of a filtration system to monitor, for a current filtration cycle, at least one of a change in fluid filtrate throughput during constant pressure operation or a change in pressure during constant filtrate throughput operation;
determine a fouling mechanism within the filtration system based on at least one of a determination that the change in fluid filtrate throughput for the current filtration cycle is greater than a change in fluid filtrate throughput for a previous filtration cycle or a determination that the change in pressure for the current filtration cycle is greater than a change in pressure for a previous filtration cycle;
select a cleaning protocol for the filtration system based on the determined fouling mechanism; and
cause the filtration system to perform a cleaning procedure according to the selected cleaning protocol.

22. The non-transitory computer-readable storage medium of claim 21, wherein the processor-executable instructions that, when executed by the computing device, cause the computing device to determine a fouling mechanism further cause the computing device to perform a mathematical analysis of the change in fluid filtrate throughput.

23. The non-transitory computer-readable storage medium of claim 22, wherein the mathematical analysis of the change in fluid filtrate throughput is performed according to one or more predetermined fouling models.

24. The non-transitory computer-readable storage medium of claim 23, wherein the one or more predetermined fouling models comprises one or more of a Hermia's model, a modified Hermia's model, or a resistance-in-series model.

25. The non-transitory computer-readable storage medium of claim 21, wherein the processor-executable instructions that, when executed by the computing device, cause the computing device to cause a flow sensor of a filtration system to monitor a change in fluid filtrate throughput further cause the computing device to cause the flow sensor to measure filtrate flow over a predefined period of time.

26. The non-transitory computer-readable storage medium of claim 21, wherein the fouling mechanism comprises one or more of concentration polarization, organic adsorption of chemically-active molecules, scale due to precipitation of salts and hydroxides, cake and pore blocking due to deposition of large suspended particles or small colloidal particles, gel-formation due to deposition of inert macromolecules, or bio-fouling due to deposition and growth of biologically active organisms.

* * * * *